United States Patent
Tu et al.

(10) Patent No.: US 7,443,282 B2
(45) Date of Patent: Oct. 28, 2008

(54) SYSTEM AND A METHOD, INCLUDING SOFTWARE AND HARDWARE, FOR PROVIDING REAL-TIME AND SYNCHRONIZATION VIEWS OF SUPPLY CHAIN INFORMATION

(75) Inventors: Mengru Tu, Taipei (TW); Kuo-Sue Lo, Hsin Chu (TW); Chuan-Yu Wu, Taipei (TW); Cheng-Wei Huang, Chungho (TW); Ho-Chun Lei, Tai Chung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 399 days.

(21) Appl. No.: 11/122,054

(22) Filed: May 5, 2005

(65) Prior Publication Data
US 2006/0250248 A1 Nov. 9, 2006

(51) Int. Cl.
*H04Q 5/22* (2006.01)
*G08B 13/14* (2006.01)

(52) U.S. Cl. .................. 340/10.1; 340/572.1; 235/385; 700/215

(58) Field of Classification Search .............. 340/572.1, 340/10.1, 10.3, 10.4–10.52; 235/385; 700/215, 700/221–227
See application file for complete search history.

(56) References Cited

U.S. PATENT DOCUMENTS

| | | | | |
|---|---|---|---|---|
| 5,635,693 A * | 6/1997 | Benson et al. | ........... | 340/10.33 |
| 5,961,332 A * | 10/1999 | Joao | ........................... | 434/236 |
| 6,211,781 B1 * | 4/2001 | McDonald | .............. | 340/572.1 |
| 6,285,916 B1 * | 9/2001 | Kadaba et al. | ............... | 700/222 |
| 6,801,833 B2 * | 10/2004 | Pintsov et al. | ............... | 700/223 |
| 6,967,577 B2 * | 11/2005 | Taylor et al. | ............. | 340/572.1 |
| 7,019,642 B2 * | 3/2006 | Nelson et al. | ............ | 340/539.1 |
| 7,136,832 B2 * | 11/2006 | Li et al. | ...................... | 340/505 |
| 2002/0029178 A1 * | 3/2002 | Wiederin et al. | .............. | 705/34 |

* cited by examiner

*Primary Examiner*—George A Bugg
*Assistant Examiner*—Eric M Blount
(74) *Attorney, Agent, or Firm*—Rabin & Berdo, P.C.

(57) ABSTRACT

A system and method, including software and hardware, for providing an accurate, real-time, and synchronized view of supply chain information. The system utilizes various RFID technologies (like an RFID tag, an RFID reader, and an RFID middleware software) to collect and manage data in real time. It then implements a synchronization mechanism to synchronize supply chain data from various data sources within and across a company in near real time fashion to allow different types of enterprise users, both internal and external, to access the synchronized information and take synchronized action within an appropriate timeframe.

14 Claims, 15 Drawing Sheets

SYSTEM AND A METHOD, INCLUDING SOFTWARE AND HARDWARE, FOR PROVIDING REAL-TIME AND SYNCHRONIZATION VIEWS OF SUPPLY CHAIN INFORMATION

BACKGROUND OF THE INVENTION

1. Field of the Invention

The present invention relates to a system and a method, including software and hardware, for providing real-time and synchronization views of supply chain information, and particularly relates to a system and a method for providing real-time and synchronization views of supply chain information by a combination of RFID and IT (Information Technology) technology.

2. Description of the Related Art

RFID (Radio Frequency Identification) is a high-tech bar code, which can be scanned from a predetermined distance or through a box or other packing container. RFID is an electronic information support device, it is used to distinguish, track, sort and confirm various objects via radio waves for differentiating identifications (IDs). Furthermore, RFID has some advantages such as active property, distance reading and high storage capacity.

RFID is widely used, for example as animal locating chips, mobile burglar proof chips, entrance guard controls, parking space controls, automatic production and material management, etc. In property application aspects, RFID is used to reduce the cost to retail business of controlling their stock and supply chains, reducing control and management costs and increasing dispatching elasticity for stock goods. At the same time, RFID can be used to track goods at their various stages between production and selling.

For supply chain systems of prior art, scene information is obtained via scene workers or present non-real-time systems such as ERP, MRP and MES. Scene information is then transmitted to the supply chain system via multi-layer ETL (Extraction Transformation and Loading) procedures. Hence many information errors will occur and the accuracy of supply chain planning will be affected substantially. However, scene information can be obtained and transmitted to answer queries by workers or customers. Moreover, when errors occur in scene processing work, abnormal information can be obtained via RFID. This abnormal information can be stored for reference for making improvements to the system at a later time.

The supply chain system of the prior art has some defects that can be summarized as:

1. Because information of a supply chain system is not asymmetrical, the quality of information is not good;

2. The supply chain visibility is low, so the supply chain system suffers from a bullwhip effect. The bullwhip effect is a metaphor in which the supply chain is a bullwhip, the need end of the supply chain is the bullwhip's handle and the supply end of the supply chain is the bullwhip's tail. Hence, when the need end of the supply chain has a small change this is similar to a light movement of the bullwhip handle. This however causes a far larger movement in the bullwhip tail. In a supply chain system of the real world, a supplier chooses to order more stock to prevent goods a later shortage in order to increase customer satisfaction. However, because of this a false impression will be created that these goods are in high demand. In order to solve the bullwhip effect, an effective method is to increase supply chain visibility to reduce supply chain inventory levels and decrease the ill-effects of the bullwhip effect; and 3. The supply chain system of prior art is unable to increase CPFR (Collaborative Planning, Forecasting and Replenishment) efficiency for increasing enterprise order fulfillment rate and reducing inventory levels.

SUMMARY OF THE INVENTION

The present invention provides an RFID-enabled Real-time Supply Chain Synchronization System (R2SCSS). The present invention is used to solve the problem of information asymmetry for improving the quality of supply chain information, to reduce the bullwhip effect, increase CPFR (Collaborative Planning, Forecasting and Replenishment) efficiency for increasing enterprise order fulfillment rates and reducing enterprise inventory levels.

One aspect of the invention is to provide an RFID-enabled Real-time Supply Chain Synchronization System (R2SCSS), comprising: an RFID and Sensor Gateway Component for receiving information from a Tag and Reader Layer; an Information Buffer Management Component at least communicating with the RFID and Sensor Gateway Component, wherein the Information Buffer Management Component is an interface between an RFID Middleware Layer and a Data Synchronization Layer; a Database/ETL Component at least communicating with the Information Buffer Management Component; a Real-time Product Information Synchronization Component, a Real-time Manufacturing Synchronization Component, a Real-time Inventory Synchronization Component and a Real-time Demand Fulfillment Synchronization Component communicating with each other to form a Core Component, wherein the Core Component communicates with the Information Buffer Management Component and the Database/ETL Component; a Data Warehouse communicating with the Information Buffer Management Component, the Database/ETL Component and the Core Component; and a Web Portal Component communicating with the Core Component for use by a user.

One aspect of the invention is to provide a method for an RFID-enabled Real-time Supply Chain Synchronization System (R2SCSS), comprising: inputting a new RFID tag or an item ID of an RFID tag; initiating the new RFID tag via the initialization module; reading initiated information of the RFID tag or directly reading normal item IDs of the RFID tag via the Tag Read/Write Module; reading processing information via the Tag Read/Write Module; and judging whether the reading is normal via the Tag Read/Write Module.

One aspect of the invention is to provide a method for an RFID-enabled Real-time Supply Chain Synchronization System (R2SCSS), comprising: inputting abnormal item IDs of an RFID tag; reading the abnormal item ID of the RFID tag via the Monitoring and Alert Module; querying processing information from the abnormal item ID of the RFID tag via the Manufacturing Information Synchronization Data Model; reading the processing information from the abnormal item ID of the RFID tag via the Monitoring and Alert Module; looking for an abnormal workstation via the Monitoring and Alert Module; sending out an alert to the abnormal workstation via the Monitoring and Alert Module; writing abnormal processing information via the Manufacturing Information Synchronization Data Model; and outputting the abnormal processing information table.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objectives and advantages of the present invention will be more readily understood from the following detailed description when read in conjunction with the appended drawing, in which.

DETAILED DESCRIPTION OF PREFERRED EMBODIMENTS

The present invention provides a system and a method, including software and hardware, for providing real-time and synchronization view of supply chain information. The software and the hardware will be more readily understood from the following detailed description.

Figure 1:
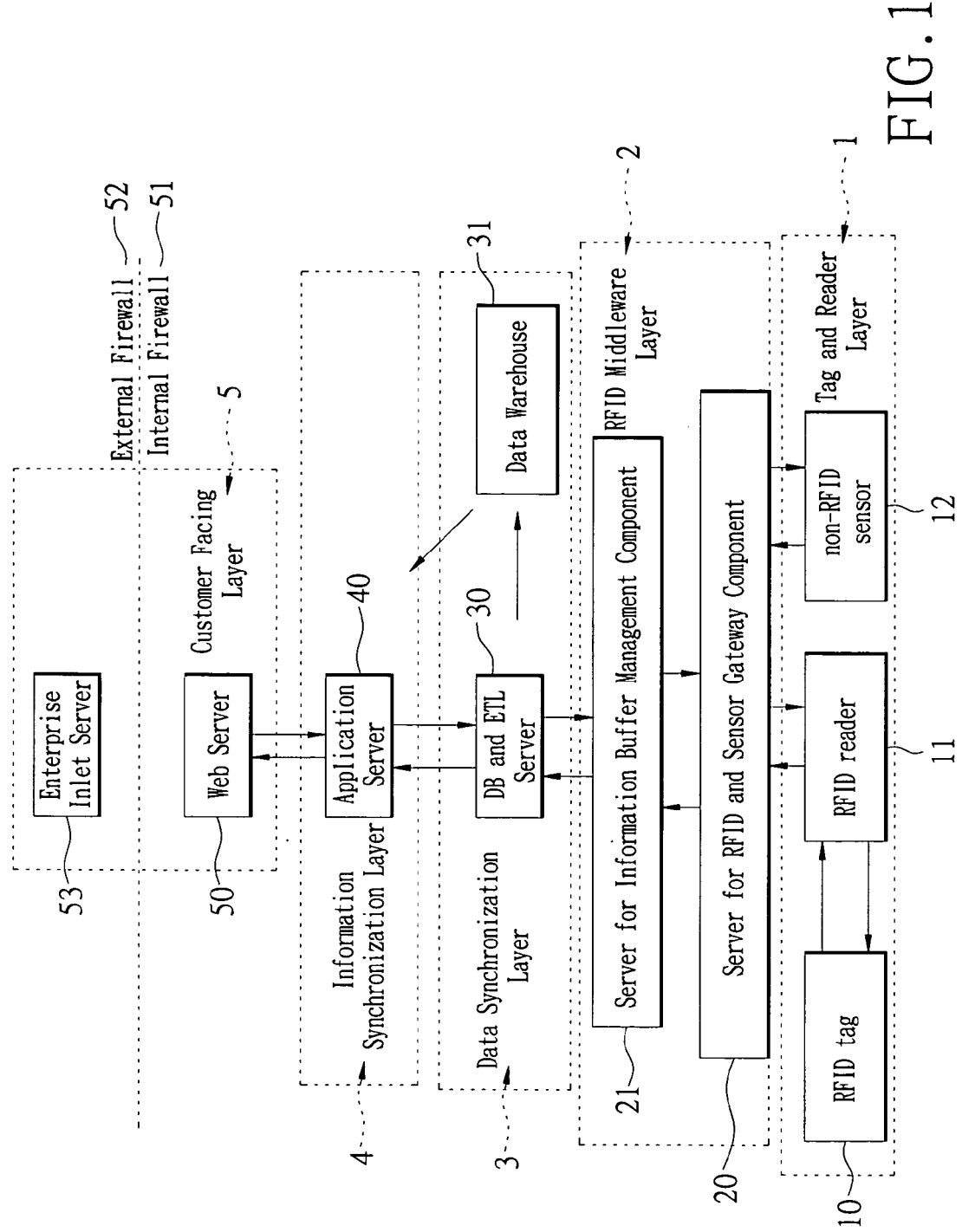
FIG. 1 is a block diagram of a hardware configuration according to the present invention.

FIG. 1 shows a block diagram of a hardware configuration according to the present invention. The hardware configuration mainly includes a Tag and Reader Layer 1, an RFID Middleware Layer 2, a Data Synchronization Layer 3, an Information Synchronization Layer 4 and a Customer Facing Layer 5.

In general, the system for providing a real-time and synchronization view of supply chain information is set up by a core factory owner or an information supplier. The Tag and Reader Layer 1 has an RFID tag 10, an RFID reader 11 and a non-RFID sensor 12. The RFID tag 10 and the RFID reader 11 communicate with each other. The RFID Middleware layer 2 has a Server for RFID and a Sensor Gateway Component 20 and a Server for Information Buffer Management Component 21 communicating with each other, wherein the RFID reader 11 and the non-RFID sensor 12 communicate with the Server for the RFID and a Sensor Gateway Component 20. The Data Synchronization Layer 3 has a DB (Database) and ETL (Extraction Transformation and Loading) Server 30 that communicates with the Server for Information Buffer Management Component 20, and a DW (Data Warehouse) 31 for receiving data from the DB and ETL Server 30. The Information Synchronization Layer 4 has an Application Server 40 communicated with the DB and ETL Server 30, and is used to receive data from the DW 31. The Customer Facing Layer 5 has a Web Server 50 for providing Internet service and an Internet portal.

The users inside an enterprise such as such as customers, suppliers or partners can connect to the hardware configuration (Real-time supply chain synchronization system) of the present invention via an Enterprise Inlet Server 53, an Intranet with an internal firewall or an Internet with an external firewall.

Figure 2:
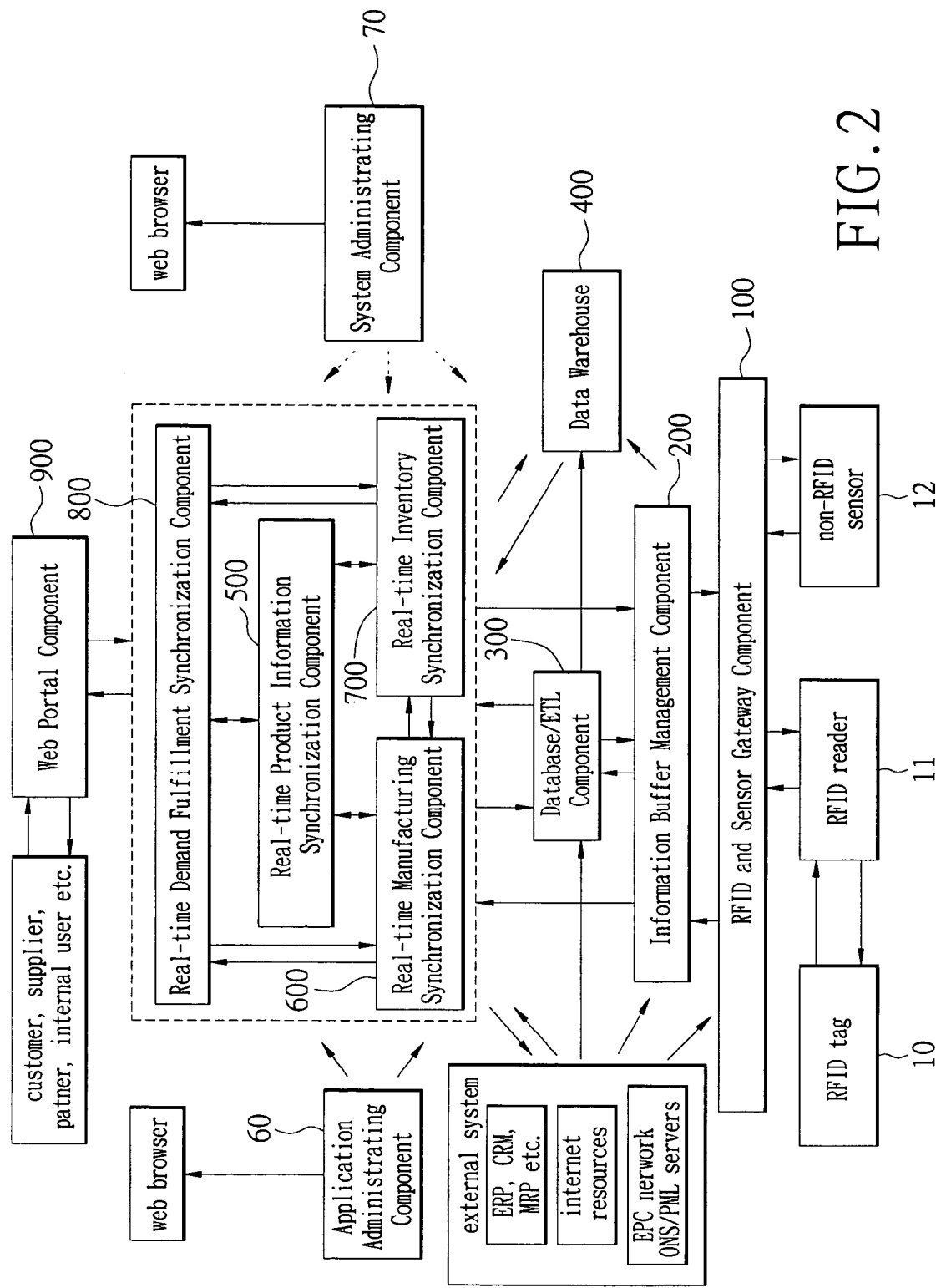
FIG. 2 is a block diagram of a software system according to the present invention.

FIG. 2 shows a block diagram of a software system according to the present invention. The software system is used to build a R2SCSS (RFID-enabled Real-time Supply Chain Synchronization System) that is a working core for an enterprise supply chain. The R2SCSS comprises an RFID tag 10, an RFID reader 11, an RFID and Sensor Gateway Component 100, an Information Buffer Management Component 200, a Database/ETL Component 300, a Data Warehouse 400, a Real-time Product Information Synchronization Component 500, a Real-time Manufacturing Synchronization Component 600, a Real-time Inventory Synchronization Component 700, a Real-time Demand Fulfillment Synchronization Component 800, an Application Administrating Component 60, a System Administrating Component 70 and a Web Portal Component 900.

Referring to FIG. 2, the RFID and sensor gateway component 100 is mainly used to process data of the RFID reader 11 and transmit the preprocessing data to the Information Buffer Management Component 200. In order to achieve the above objective, the RFID and Sensor Gateway Component 100 has some functions and characteristics, as follows:

A. It is compatible with any type of RFID reader 11 (or a sensor reader);

B. It is capable of managing many RFID readers 11 at the same time;

C. It can authenticate new RFID readers 11 into the system, and automatically integrate new RFID Readers 11 with the system;

D. It filters and aggregate RFID data;

E. It provides a data transmission and caching function for quickly transmitting data to the Information Buffer Management Component 200 or another receiving system;

F. It can provide a stylized interface for allowably defining or modifying data of RFIDs or processing logic of an RFID event;

G. It can provide a data recovery function; and

H. It is capable of communicating with a far-end or another RFID and sensor gateway component 100.

Referring to FIG. 2, the Information Buffer Management Component 200 is mainly used as an interface between the RFID Middleware Layer 2 and the Data Synchronization Layer 3. Moreover, the Information Buffer Management Component 200 has some functions and characteristics, as follows:

A. It can receive RFID data or an RFID event from the RFID and Sensor Gateway Component 100, and further filter, transform and integrate with the RFID data or the RFID event for synchronization with the RFID data, then monitor goods movement or important operating procedures via pre-integrated data;

B. It has a storage and recovery function: the Information Buffer Management Component 200 has a complete database for recording the data and providing a recovery function to prevent the data from being damaged, wherein the information of the database can be used for the Information Buffer Management Component 200 and all relevant external systems;

C. It has a message routing service for providing a reliable message receiving and sending service between the RFID Middleware Layer 2, the Data Synchronization Layer 3 and other external systems, such as an ERP system or an EPC global network;

D. It can manage many RFIDs and sensor gateway components 100 at the same time;

E. It has a business data adapter/interface: because the Information Buffer Management Component 200 is disposed in a top layer of the RFID Middleware Layer 2, it must communicate frequently with different types of application modules in a system and any external systems, such as an ERP system or an EPC global network. Hence, a business data adapter/interface is provided, such as an adapter for Oracle's ERP, an adapter for SAP's ERP, or an adapter for XML or PML data for increasing data transmission speed, reducing error rates and simplifying complex data transformations;

F. It has a business process flow management system: whether data flow in the RFID Middleware Layer 2 or system interaction between the RFID Middleware Layer 2 and other application systems contains the business process flow, the Information Buffer Management Component 200 must provide suitable process flow monitoring and management functions for ensuring that the business process flow is working correctly; and G. It provides a stylized interface for allowably defining or modifying processing logic of the business process flow.

Figure 3:
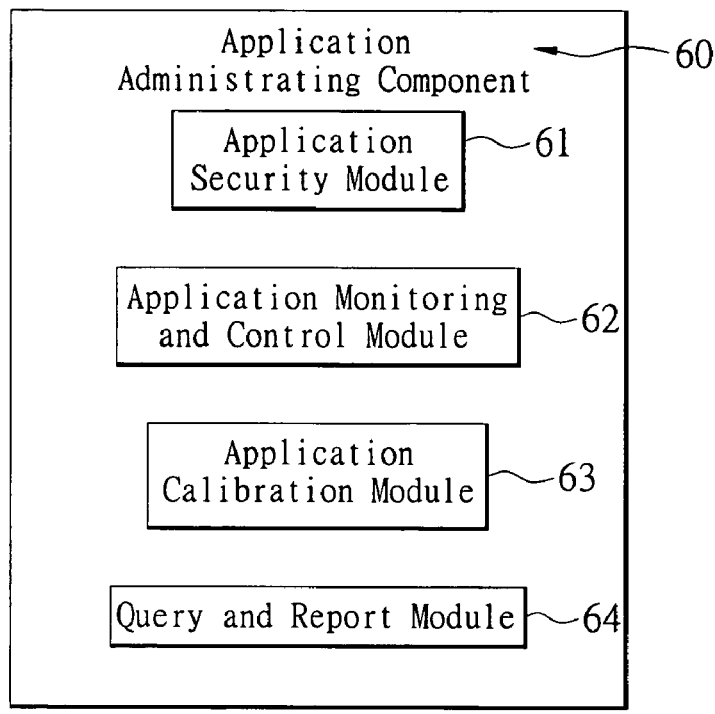
FIG. 3 is a block diagram of an Application Administrating Component of a software system according to the present invention.

FIG. 3 shows a block diagram of an Application Administrating Component of a software system according to the present invention. The Application Administrating Component 60 is used to monitor a complete system for software operation, including:

1. An Application Security Module 61: the Module 61 is used to set and manage a user's ID and a user's access rights;

2. An Application Monitoring and Control Module 62: the Module 62 is used to monitor and process abnormal stats in the application system;

3. An Application Calibration Module 63: the Module 63 is used to provide system parameter setting corresponding to the system for real-time and synchronization views of supply chain information, wherein the setting will affect a Demand Fulfillment Synchronization Engine 805; and 4. A Query and Report Module 64: the Module 64 is used to provide a query and report service for the Application Administrating Component 60.

Figure 4:
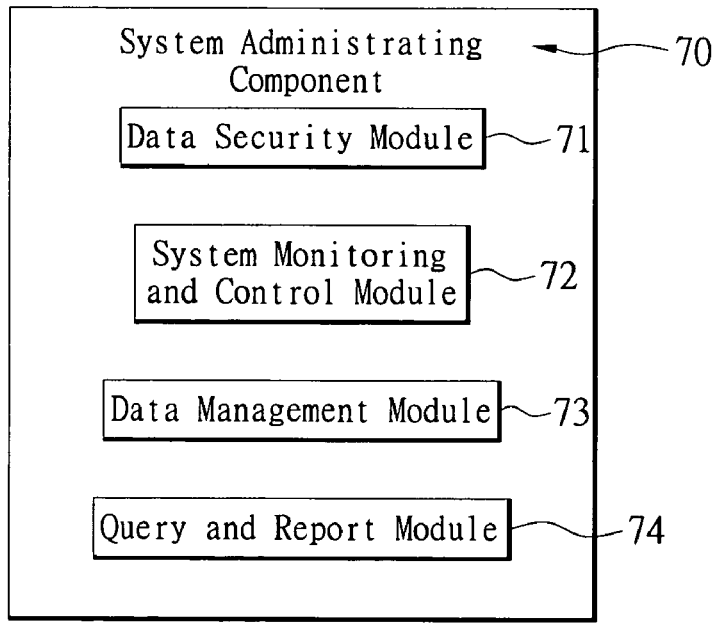
FIG. 4 is a block diagram of a System Administrating Component of a software system according to the present invention.

FIG. 4 shows a block diagram of a System Administrating Component for a software system according to the present invention. The System Administrating Component 70 is used to monitor a complete system for hardware and software operation, including:

1. A Data Security Module 71: the Module 71 is used to control the transmission security of RFID data for preventing the RFID reader 11a from breaking down and thereby damaging the system. Moreover, the Module 71 provides a protecting function for preventing RFID data from being tampered with or stolen during data transmission and confirming whether the RFID data is complete;

2. A System Monitoring and Control Module 72: the Module 72 is used to monitor and process abnormal hardware and software operation states of the application system. Moreover, the System Monitoring and Control Module 72 has a system performance turning and trouble shooting function;

3. A Data Management Module 73: the Module 73 has a data backup and recovery function for confirming that the system data sent from the RFID Middleware Layer 2 to the application module layers is complete and correct; and 4. A Query and Report Module 74: the Module 74 is used to provide a query and report service for the Application Administrating Component 60.

Figure 5:
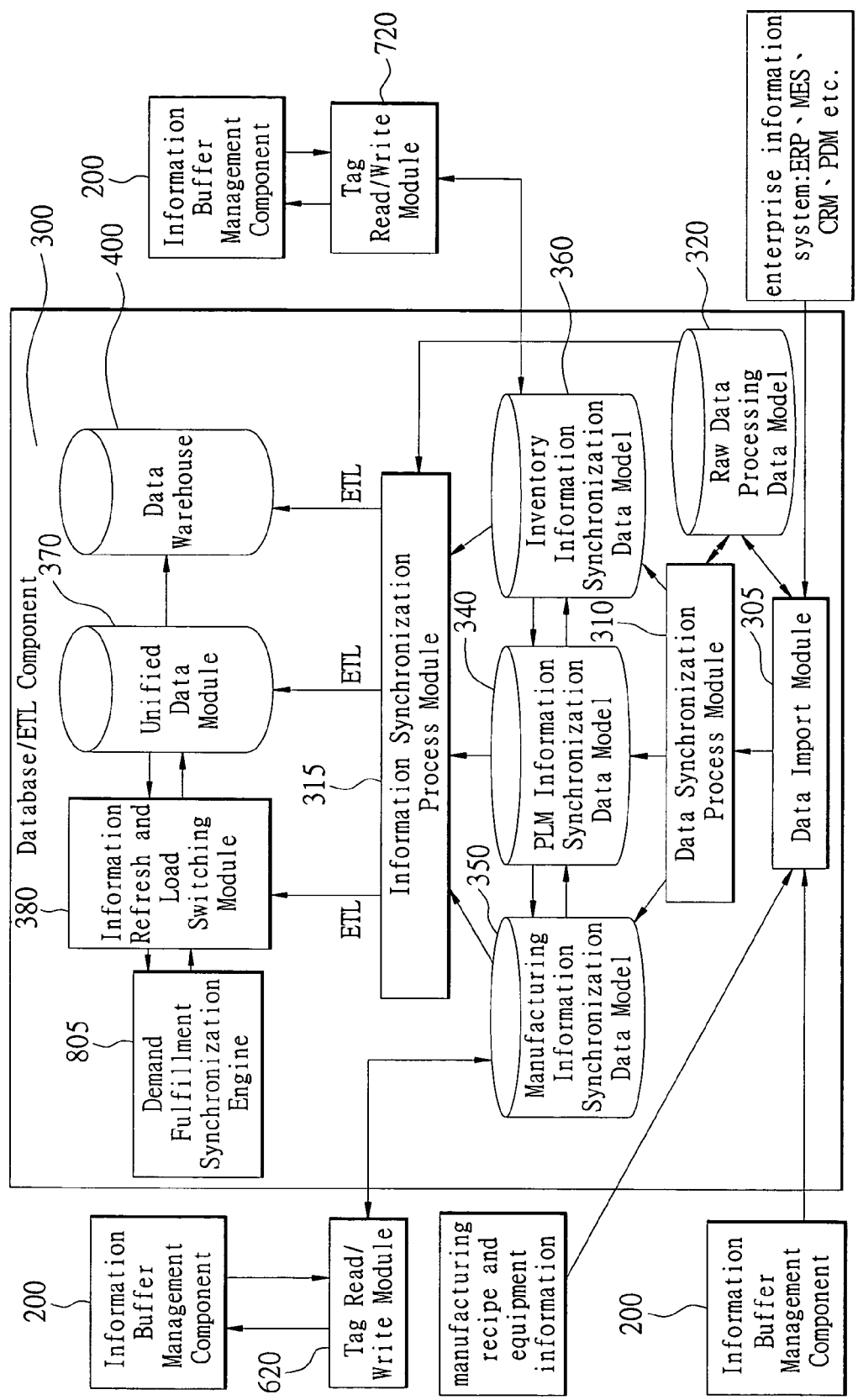
FIG. 5 is a block diagram of a Database/ETL Component of a software system according to the present invention.

FIG. 5 shows a block diagram of a Database/ETL Component of a software system according to the present invention. The Database/ETL Component 300 is the core for data processing logic and data storage in the system for providing real-time and synchronization views of supply chain information. The different data models are database tables designed by E-R modeling, and the data can be stored in single or dispersive database systems. Moreover, ETL refers to three steps—extraction, transformation and loading—during data transmission. The Database/ETL Component 300 includes:

1. A Data Import Module 305: The Module 305 is used to receive data from different sources (such as data from the Information Buffer Management Component 200, data from an ERP system or a CRM, and relevant data about processes and equipment) and initially filter and transform the data, wherein the initial preprocessing data is stored in a Raw Data Processing Data Model 320.

2. A Data Synchronization Process Module 310: The Module 310 is used to further process data that is cached in the Raw Data Processing Data Model 320 for ensuring its completeness and unity, and then transmitting the data individually to a PLM Information Synchronization Data Model 340, a Manufacturing Information Synchronization Data Model 350 and a Inventory Information Synchronization Data Model 360 via an ETL procedure.

3. A Raw Data Processing Data Model 320: The Data Model 320 is mainly a cached area for storing initial preprocessed data and then transmitting the data to the Data Synchronization Process Module 310 and an Information Synchronization Process Module 380 for further processing.

4. A Product Information Synchronization Data Model 340: The Data Model 340 is used to store synchronal master data (the main base data of R2SCSS, such as some base data for components), planning BOM data and production life cycle of the main object of the R2SCSS. The Data Model 340 is an operational data store such as a special kind of database that keeps current (near real-time) operational data provided by the Data Synchronization Process Module 310. The R2SCSS will keep processed operational data (in the Data Model 340) for at least one month to as long as 6 months, depending on the parameters set in the Application Calibration Module 63 of the Application Administrating Component 60. If data volume exceeds the maximum limit (ex. 6 months), then old data (data that has a history longer than 6 months) will be removed from the Data Model 340 and moved to the Data Warehouse 400.

5. A Manufacturing Information Synchronization Data Model 350: the Data Model 350 is mainly used to store synchronal producing and manufacturing information and relevant processing information. The Data Model 350 is an operational data store such as a special kind of database that keeps current (near real-time) operational data. The Data Model 350 receives operational data from the following data sources: the Data Synchronization Process Module 310, a Tag Read/Write Module 620 and the Product Information Synchronization Data Model 340. The R2SCSS will keep processed operational data (in the Data Model 350) for at least one month to as long as 6 months, depending on the parameters set in the Application Calibration Module 63 of the Application Administrating Component 60. If data volume exceeds the maximum limit (ex. 6 months), then old data (data that has a history longer than 6 months) will be removed from the Data Model 350 and moved to the Data Warehouse 400.

6. An Inventory Information Synchronization Data Model 360: the Data Model 360 is mainly used to store information, such as synchronal inventory, warehouse and material flow. The Data Model 360 is an operational data store such as a special kind of database that keeps current (near real-time) operational data. The Data Model 360 receives operational data from the following data sources: the Data Synchronization Process Module 310, a Tag Read/Write Module 720, and the Product Information Synchronization Data Model 340. The R2SCSS will keep the processed operational data (in the data model 360) from at least one month to as long as 6 months, depending on the parameters set in the Application Calibration Module 63 of the Application Administrating Component 60. If data volume exceeds the maximum limit (ex. 6 months), then old data (data that has a history longer than 6 months) will be removed from the Data Model 360 and moved to the Data Warehouse 400.

7. An Information Synchronization Process Module 315: the Module 315 is used to further process and extract data stored in the Data Models 340, 350 and 360 to ensure their completeness and unity. The data is then transmitted to a Unified Data Module 370 via an ETL procedure or transmitted to the Information Refresh and Load Switching Module 380 via an ETL procedure firstly for further processing and then for storage in the Unified Data Module 370. Accordingly, dynamic data, such as relevant data that has been pegged, is transmitted to the Module 380 for processing, wherein both the Module 380 and the Demand Fulfillment Synchronization Engine 805 calculate and process the data together. Accordingly, static data or other data, such as data that has not been recalculated, is transmitted directly to the Unified Data Module 370. Accordingly, other data, such as data that needs to be stored for longer periods, is transferred from the Data Models 340, 350, 360 and 370 and stored in the Data Warehouse 400 via the Module 315 for use in follow-up analysis.

8. An Unified Data Module 370: the Unified Data Module can also be called an operational metadata store—a special kind of data warehouse that keeps current (near real-time) operational metadata that has been extracted from multiple operational data sources, consolidated and normalized into a complete data model, and made available for various queries and analysis. Metadata means "data about other data". This metadata adds insight to the daily operational data collected from various data sources within and across a company. Information such as aggregations, associations, and stratifications that are not already defined in operational data are examples of this. Various modules in the Real-time Demand Fulfillment Synchronization Component 800 can perform simple analyses quickly or complex analyses over extended periods based on the metadata. These modules can also produce complex analyses and recommendations for action for an entire business environment quickly enough for people to be able to view, understand, and act upon to it in the same day. Thus the R2SCSS has a unique way of providing extensive analysis metadata about a company's current operational state 24 hrs a day, every day. It can also inform an entire supply chain's members of an event less than half an hour after operational data events that could impact the supply chain have occurred. Thus, the data stored in the Data Model 370 can be called operational metadata since it is the metadata that captures the on-going operational state of a supply chain, and the Data Model 370 can be called an operational metadata store. Finally, the R2SCSS will keep processed operational metadata (in the Data Model 370) for at least 3 months to as long as 15 months, depending on the parameters set in the Application Calibration Module 63 of the Application Administrating Component 60. If data volume exceeds the maximum limit (ex. 15 months), then old data (data that has a history longer than 15 months) will be removed from the Data Model 370 and moved to the Data Warehouse 400.

9. An Information Refresh and Load Switching Module 380: the Module 380 works with the Demand Fulfillment Synchronization Engine 805 to implement a unique information building plus data caching and switching mechanism to achieve fast turnaround of operational data from the Data Models 320, 340, 350 and 360. The Module 380 receives snapshots of operational data from the Information Synchronization Process Module 315 at specified time intervals (users can set the time interval parameters through the Application Calibration Module 63 in the Application Administrating Component 60. Usually, the time interval would be set around half an hour. Each collection of snapshots carries enough operational state information for synchronization calculation. Upon loading each collection of operational data snapshots, the Module 380 gives enough information to the Demand Fulfillment Synchronization Engine 805 for recalculating all supply and demand pegging relationships (all dimensional pegging) and then builds many layers of operational metadata with new relationships, associations, aggregations, and stratifications for navigation, mining and analysis in the Unified Data Model 370. There are two database instances (they can reside in the same physical database server or separate ones) with the same data model (the Unified Data Model 370) to handle the Information Refresh and Load Switching Mechanism 380. While the user is viewing, analyzing, or acting upon one set of operational metadata for one database instance, the other one is in the process of being built by the Module 380 (it is simultaneously collecting another set of snapshots of current operational data and creating a new set of operational metadata). When the building process is finished and such a set of operational metadata is ready, the database pointers are automatically switched to this newly built database instance and the original database instance picks up the operational metadata building process immediately. When the Module 380 detects such a change (the swap of database instances), the newly updated operational metadata will be cached in the application server's memory. When an application module such as a Sales and Order Management Module 830 in the Real-time Demand Fulfillment Synchronization Component 800 detects the newly cached operational metadata, the module also automatically switches and binds to the new set of cached operational metadata and leaves the current or old cached operational data set behind, with the computing resources allocated for those cached data set being released as well. The process of loading and building new operational metadata and then switching database instances is called load switching. When the load switching processes are finished, users can query the newly refreshed and cached operational metadata through the Web Portal Component 900 almost unnoticed. End users will not sense any data change but only the current refreshed operational metadata. Even though the cached operational metadata is not quite real time (it has approximately an half an hour delay or more depending on the volume of operational data or a machine's computation power) as opposed to operational data, it is very close to real time in terms of metadata considering the time needed for processing the pegging recalculation and building the many layers of information and complex relationships among various data elements to form the operational metadata. We can say that, in most cases, once the operational data events have occurred, less than half an hour later these application modules in the Real-time Demand Fulfillment Synchronization Component 800 will reveal critical analysis information in relation to any change. Thus, all parties of the supply chain, when seeing the same information (the constantly updated synchronized information from the Unified Data Model 370) will likely take synchronized action to resolve any supply chain gap. Performing such synchronization processes, the supply chain will approach to a near global optimization.

Notes: To summarize the information refresh and load process: A. Load (operational data)→B. Build (operational metadata)→C. Database Switch→D. Information Refresh and Cache→E. Applications switch and bind to the new caches→F. Old cache released, wherein:

A. Load step: The Information Refresh and Load Switching Module 380 periodically, for example every half hour, receives new operational data from the Information Synchronization Process Module 315.

B. Build step: After receiving the new operational data, the Information Refresh and Load Switching Module 380 is capable of providing enough information to the Demand Fulfillment Synchronization Engine 805 to calculate supply and demand pegging information. After receiving the latest operational metadata, the Information Refresh and Load Switching Module 380 provides enough information to the Demand Fulfillment Synchronization Engine 805 to recalculate for all dimensional supply and demand pegging information, and return the calculation result. The Information Refresh and Load Switching Module 380 builds multi-layers of annotated operational metadata in the Unified Data Module 370 according to the latest returned supply and demand pegging information.

C. Database Switch step: The Unified Data Module 370 uses two same database instances that are stored in the same or different databases for processing refreshed information and load switching. When the Real-time Demand Fulfillment Synchronization Components 800 uses information from a database instance, another database instance proceeds with the loading and building step. When the loading and building steps are finished, the database instance is switched to a database instance that is used by the application system, and the original database instance that is now being used automatically loads and builds information.

D. Information Refresh and Cache: After the Information Refresh and Load Switching Module 380 detects a swap of database instances, the Module 380 caches the refresh operational metadata in a flash memory of the application server.

E. Applications switch and bind to the new cache: When relevant application systems of the application server detect the latest upload of operational metadata, it is transformed and combined with new-cached information. The front-side user in the applicant system uses the latest information, but is not conscious of the above-mentioned changed information.

F. Old cache released: When new operational metadata is cashed in the flash memory of the application server, the old cashed information is deleted for releasing operational resources for the application server.

10. A Data Warehouse 400: The Data Warehouse 400 is used to store operational data that comes mainly from the Data Models 340, 350 and 360, and operational metadata that comes mainly from the Data Model 370 for use in complex data analysis and data mining. The data is acquired via a relevant ETL program within a specific time period and is stored in the Data Warehouse 400.

Figure 6:
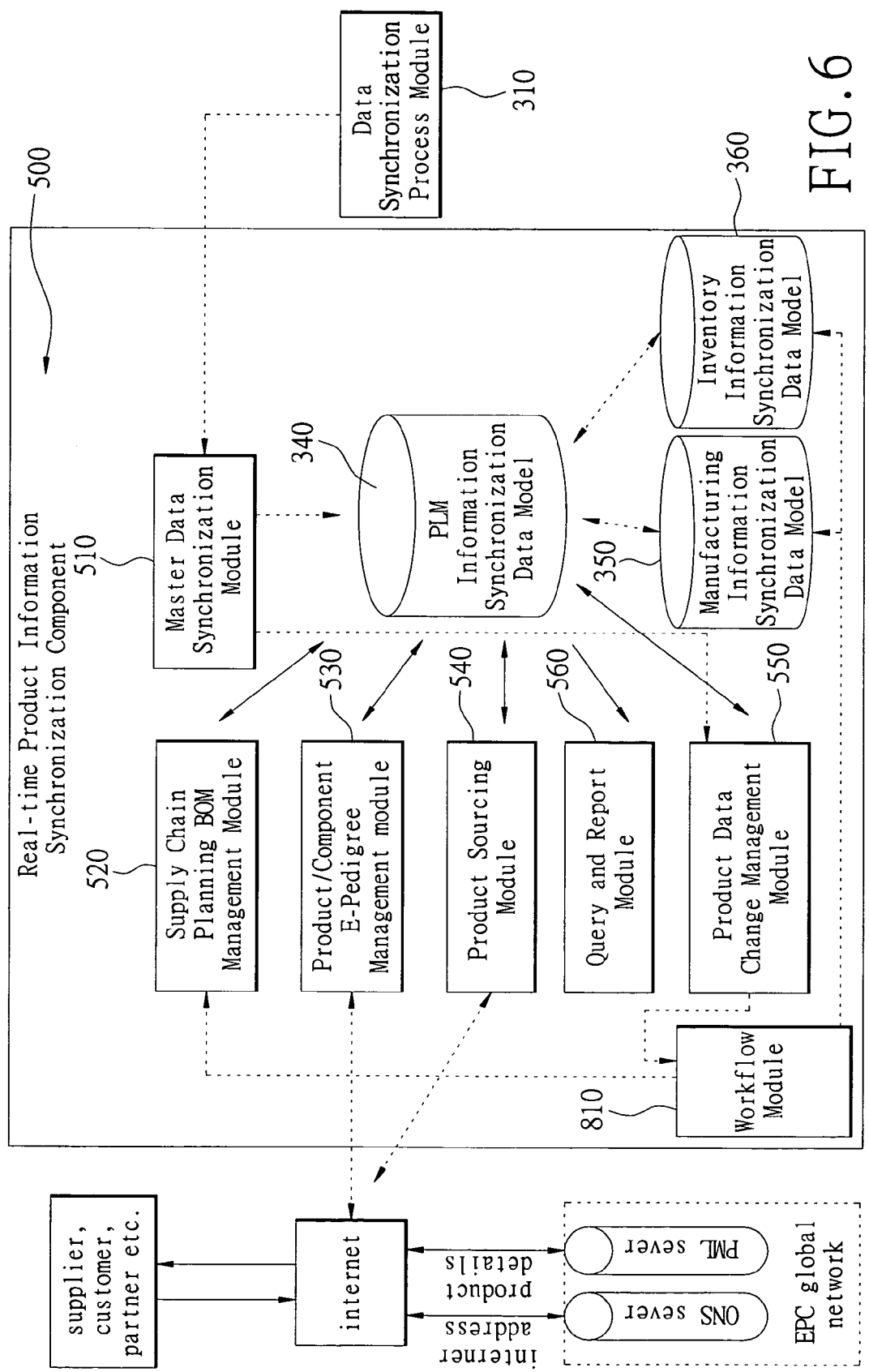
FIG. 6 is a block diagram of a Real-time Product Information Synchronization Component of a software system according to the present invention.

FIG. 6 shows a block diagram of a Real-time Product Information Synchronization Component of a software system according to the present invention. The Real-time Product Information Synchronization Component 500 includes:

1. A Master Data Synchronization Module 510: The Module 510 is used to receive preprocessing data from the Data Synchronization Process Module 310, classify and process the preprocessing data, and store the data in the Data Model 340. It is very important for the Module 510 to distinguish between master data and non-master data. According to the master data, such as item master and base data from a supplier, the Module 510 needs to confirm that the data is either new data or current data. If the present data is changed, the Module 510 needs to notify a Product Data Change Management Module 550 to do the next process for confirming that the master data stored in the Data Model 340 is synchronized. The other data is stored directly in the relevant data table of the Data Model 340.

2. A Supply Chain Planning BOM (Bill Of Material) Management Module 520: The Module 520 is used to acquire relevant item master data to build a supply chain planning a BOM within a specific time period, and then store the BOM data in the relevant tables of the Unified Data Module 370 via the ETL procedure of the Information Synchronization Process Module 315 within a specific time period. The Supply Chain Planning BOM Management Module 520 is a foundation for a Dynamic Supply Chain Planning Module 890 for supply chain planning.

3. A Product/Component E-Pedigree Management Module 530 (Electronic Pedigree is E-Pedigree for short): the Module 530 uses an RFID and an EPC (Electronic Product Code) to record and compile a movement path and a product process for an RFID event (containing make and buy component) via the EPCglobal Network (such as ONS or PML), and then building and storing E-Pedigrees in the Data Model 340. This information is available on the Internet by way of a BOM explosion through the Web Portal Component 900 for allowing a user to drill down from a top layer of the BOM to a bottom layer of the BOM (the planning BOM of the supply chain and the general BOM are separated for display), and tracking and tracing every layer of the BOM. Therefore, the complete product life cycle of any product or component of a product are displayed from production through to disposal. Hence, the Module 530 not only records base information for an event, such as its externals, weight, material and packing etc., but it is also able to trace upstream back to the raw production phase and downstream to the end-side distribution for recording detailed action paths and production processes.

4. A Product Sourcing Module 540: the Module 540 is used to provide a part searching function, a supplier/vendor sourcing function and an RFQ (Request for Quote) function.

5. A Product Data Change Management Module 550: a related mechanism of the Module 550 is driven to do something via a change in the information source of the BOM. The main action is recording relevant changed information to the Date Model 340 and publishing the information in a relevant module.

For example, when the BOM is changed in the PDM (Product Data Management) system or a PLM (Product Life Cycle Management) system, the changed information is transmitted to the Master Data Synchronization Module 510, the Product Data Change Management Module 550 and the Product Info Synchronization Data Model 340 via the Database/ETL Components 300 of the R2SCSS, finally the information is stored in the Product Info Synchronization Data Model 340. After that, the Data Models 350 and 360 are notified of the changed information via the Product Data Change Management Module 550, and a Workflow Module 810 is stored in the Product Data Change Management Module 550. Moreover, the Supply Chain Planning BOM Management Module 520 must be updated at this time. Hence, the Supply Chain Planning BOM Management Module 520 is notified about the changed information via the Product Data Change Management Module 550 and the Workflow Module 810 and stored in the Data Model 340.

6. A Query and Report Module 560: the module 560 is used to provide a querying service and a customization report for products and components.

Figure 7:
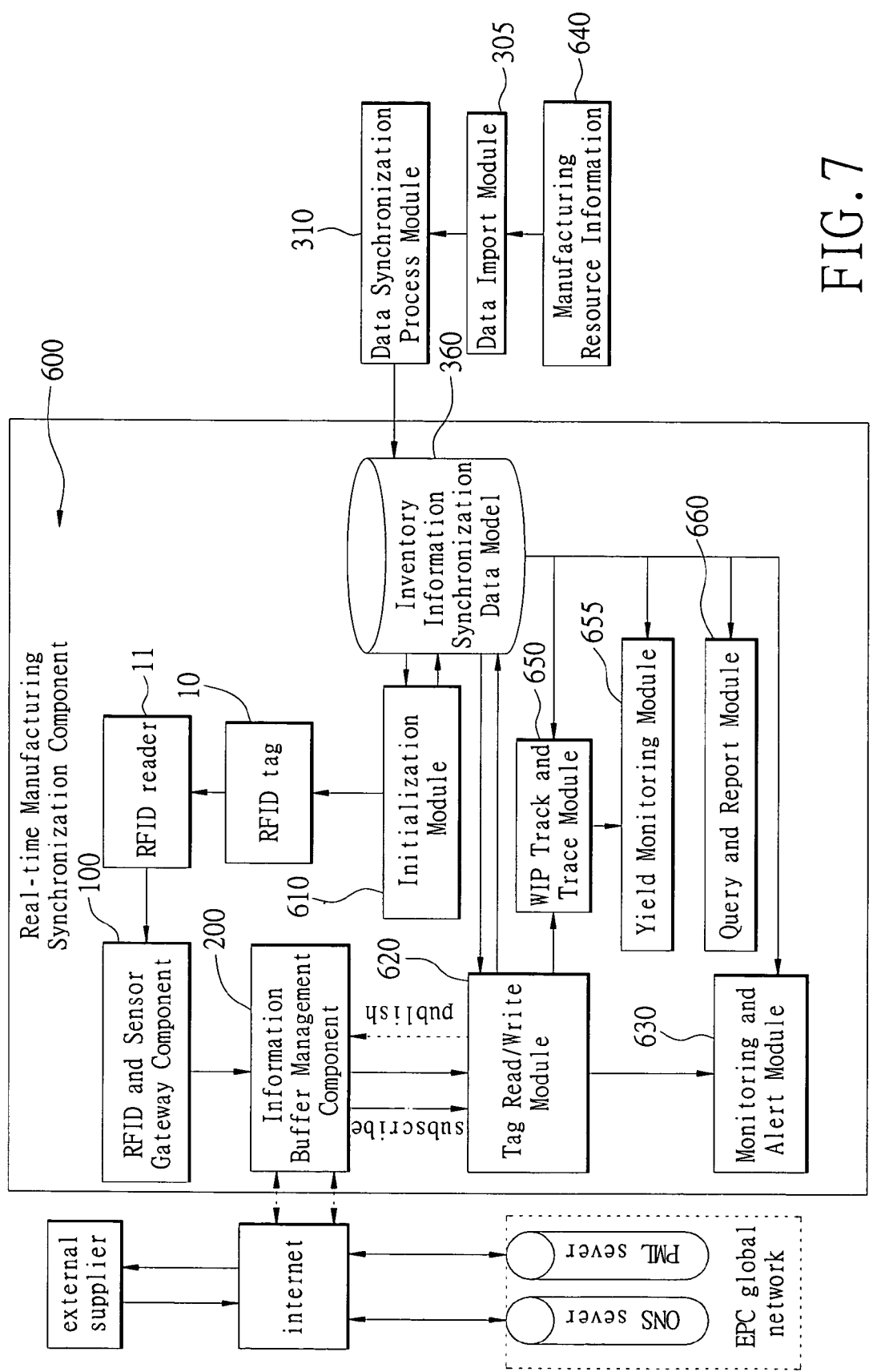
FIG. 7 is a block diagram of a Real-time Manufacturing Synchronization Component of a software system according to the present invention.

FIG. 7 shows a block diagram of a Real-time Manufacturing Synchronization Component for a software system according to the present invention. The Real-time Manufacturing Synchronization Component 600 is a present working monitoring management system, not a policy decision supply system. Hence large-scale manufacturing, such as semiconductor or TFT-LCD manufacturing, needs the component 600 to be incorporated into a company's computer system, and the Real-Time Demand Fulfillment Synchronization Component 800 is incorporated into the company's mainframe. The Real-time Manufacturing Synchronization Component 600 mainly includes:

1. An Initialization Module 610: the Module 610 is used to delete a new RFID tag or a recyclable RFID tag, and give it a new item ID in the RFID for a product. The item ID is used to represent the product from its initial production stage through to its completion. The steps of initialization comprises:

A. deleting data of an RFID tag;

B. writing a new item ID and product item ID into an RFID tag; and

C. writing the new item ID and production item ID into a batch number base information table of a database.

2. A Tag Read/Write Module 620: the Module 620 is mainly used to process information that is read by a reader, judge whether the process is normal or not, and write relevant information to a database. The detailed steps of the Module 620 are as follows:

A. The Tag Read/Write Module 620 reads data from a new tag in the workstation via a reader (the RFID data flow is: the RFID Tag 10→the RFID Reader 11→the RFID and Sensor Gateway Component 100→the RFID and Sensor Gateway Component 200→the Tag Read/Write Module 620);

B. When a new processing work piece enters a workstation, time information and workstation information are written in to relevant data tables of the Data Module 350 via the Tag Read/Write Module 620;

C. Judging whether process is normal: the step reads process information from a work piece from a database and judges whether the work piece is entering a correct processing station for processing according to a normal process of processing work. If yes, the work piece is taken as normal and enters the processing station; if no, the work piece is taken as abnormal and an alert is sent out, finally the work piece is processed by the Monitoring and Alert Module 630;

D. When one work piece enters a workstation, the Tag Read/Write Module 620 writes an entering time data for the work piece. Moreover, the new entering time data is subtracted from the previous entering time data and the work piece has a process time on the final workstation. Finally, the process time is written in the relevant data tables of the Data Model 350; and E. Judging whether the work piece is finished: When the work piece finishes its last processing work according to a processing path, the Tag Read/Write Module 620 records the work piece's state as finished in relevant data tables of the Data Model 350.

3. A Monitoring and Alert Module 630: The Module 630 is mainly used to process abnormal states on production sites. When processing an abnormal work piece or if an error in the process occurs, the module is started for controlling the situation. The Module 630 has some steps, as follows:

A. Actively discovering abnormal inventory: When a work piece enters into an incorrect workstation, the Monitoring and Alert Module 630 is actively notified by the Tag Read/Write Module 620 and obtains relevant data;

B. Reading processing information of an abnormal work piece from the relevant data tables of Data Model 350 for inquiring about a work order;

C. Sending out alerts: judging that the work piece is being processed in which workstation according to a work order, before an abnormal state occurs. When finding the workstation, the alerts are sent to a workman in the workstation; and D. Recoding abnormal information: The abnormal process records are written into the relevant data tables of the Data Model 350.

4. A Manufacturing Resource Information 640: The resource information such as machine equipment is read via an RFID or an MES system in a factory for upper layer application systems to use.

5. A WIP (Work In Process) Track and Trace Module 650: The module 650 provides a tracking function and a tracing function. For example, a user can know when the work piece needs to be executed and which process works and which workstation needs to receive the processed work piece to do the next step in the process via an inputting item ID of the work piece.

6. A Yield Monitoring Module 655: The Module 655 is used to view a processing path, a standard and a model of a product, and a quality and a yield of a product for a work piece, and a workman can obtain the above-mentioned processing information at any time.

7. Query and Report Module 660: The module 660 is used to providing a query service and a customization report for the current production information.

Figure 8:
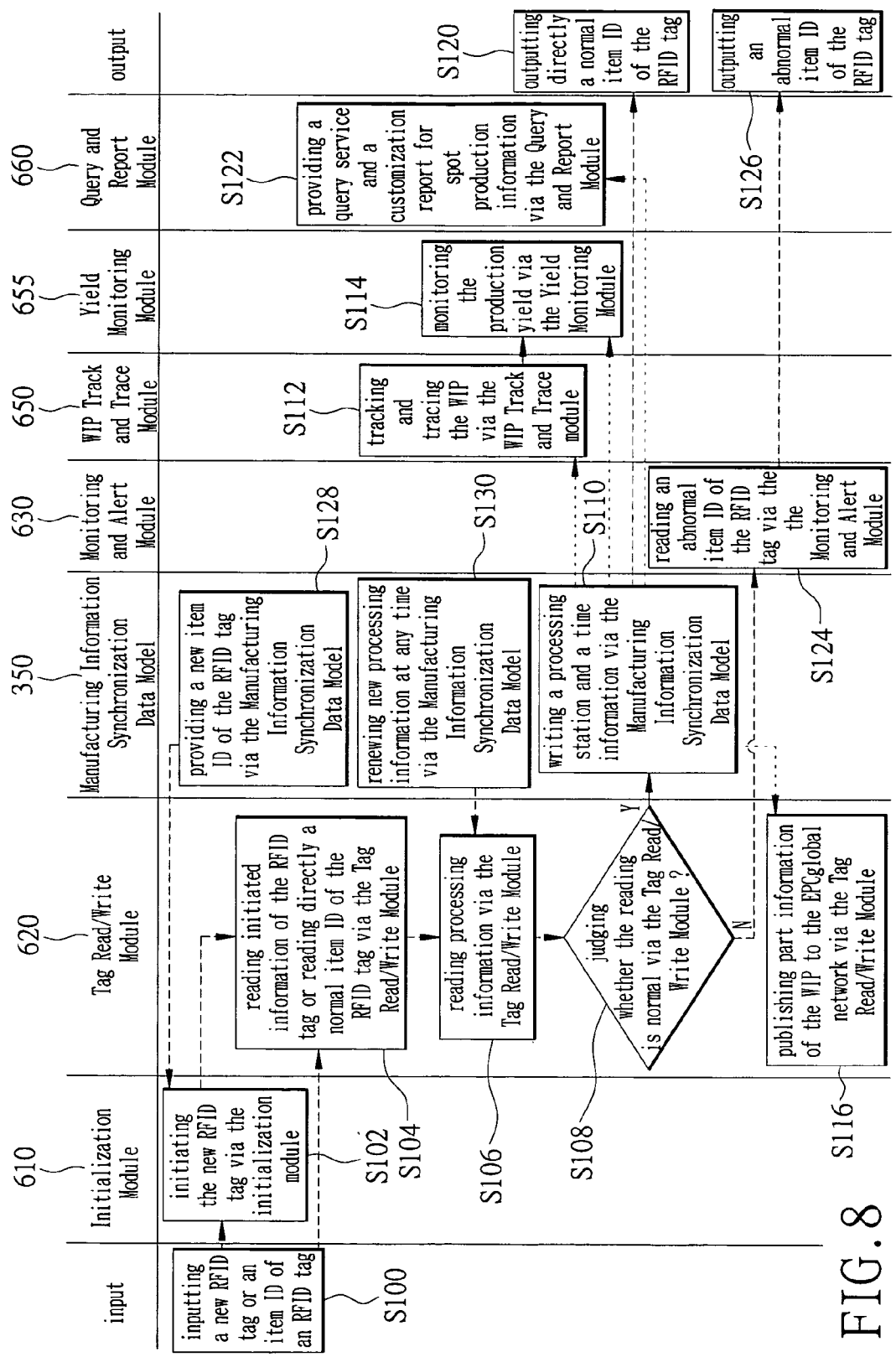
FIG. 8 is flowchart of a method for using a Real-time Manufacturing Synchronization Component of a software system according to the first embodiment of the present invention.

FIG. 8 shows a flowchart of a method for using a Real-time Manufacturing Synchronization Component of a software system according to the first embodiment of the present invention. The method comprises: firstly, inputting a new RFID tag or an item ID of an RFID tag (S100); initiating the new RFID tag via the initialization module (S102); reading initiated information of the RFID tag or reading directly a normal item ID of the RFID tag via the Tag Read/Write Module 620 (S104); reading processing information via the Tag Read/Write Module 620 (S106); judging whether the reading is normal via the Tag Read/Write Module 620 (S108); if it is normal, writing a processing station and a time information via the Manufacturing Information Synchronization Data Model 350 (S110); and then tracking and tracing the WIP via the WIP Track and Trace module 650 (S112); finally monitoring the production yield via the Yield Monitoring Module 655 (S114). After the step S110, the method further comprises publishing part information of the WIP to the EPCglobal network via the Tag Read/Write Module 620 (S116), directly doing the step S114 via the Yield Monitoring Module 655, outputting directly a normal item ID of the RFID tag (S120), or providing a query service and a customization report for spot production information via the Query and Report Module 660 (S122). If the result of the step S108 is no, reading an abnormal item ID of the RFID tag via the Monitoring and Alert Module 630 (S124); and then outputting an abnormal item ID of the RFID tag (S126). Before the step S102, the method comprises providing a new item ID of the RFID tag via the Manufacturing Information Synchronization Data Model 350 (S128). Before the step S106, the method comprises renewing new processing information at any time via the Manufacturing Information Synchronization Data Model 350 (S130).

Figure 9:
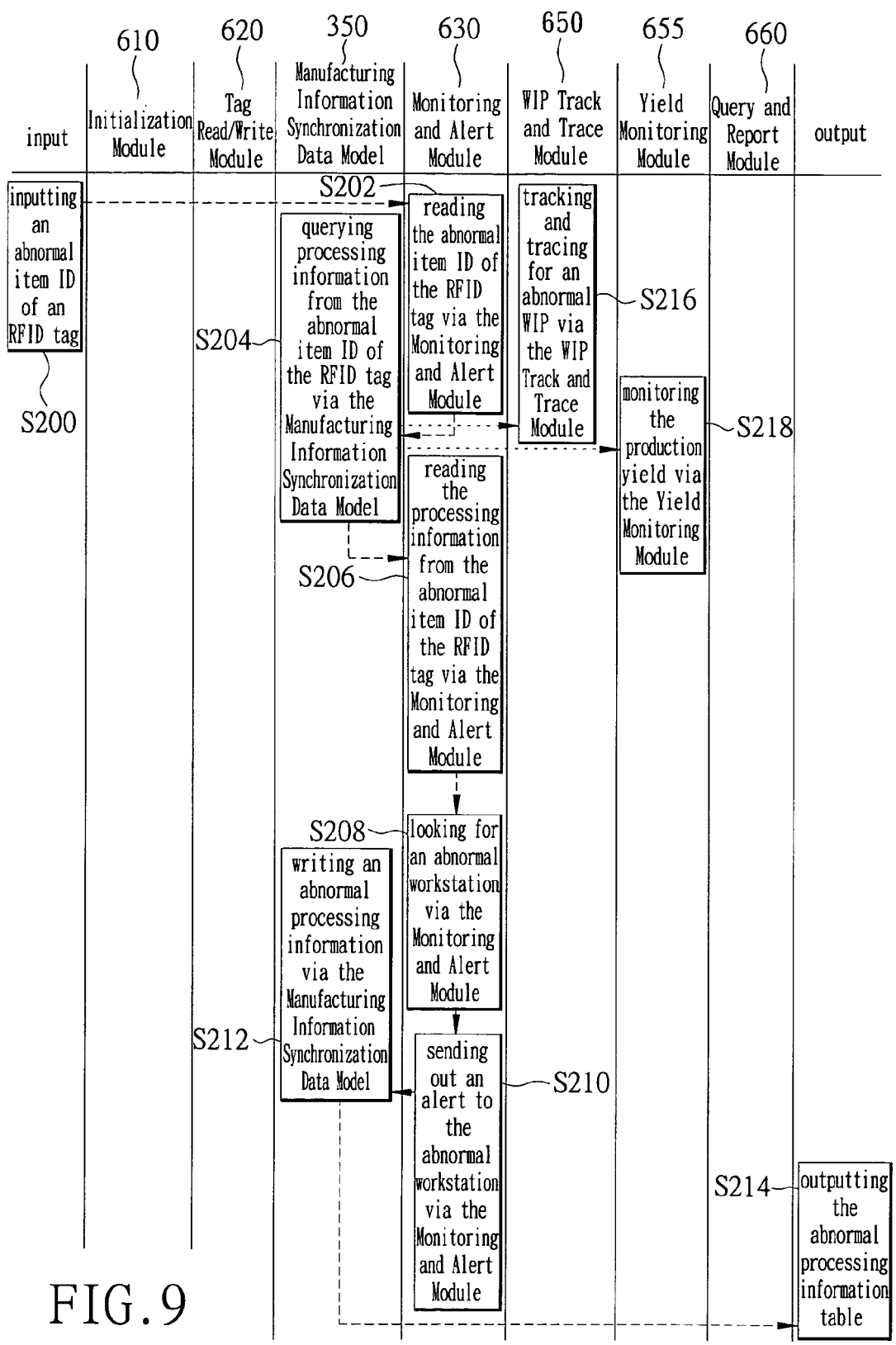
FIG. 9 is flowchart of a method for using a Real-time Manufacturing Synchronization Component of a software system according to the second embodiment of the present invention.

FIG. 9 shows a flowchart of a method for using a Real-time Manufacturing Synchronization Component of a software system according to the second embodiment of the present invention. The method comprises: inputting an abnormal item ID of an RFID tag (S200); reading the abnormal item ID of the RFID tag via the Monitoring and Alert Module 630 (S202); querying processing information from the abnormal item ID of the RFID tag via the Manufacturing Information Synchronization Data Model 350 (S204); reading the processing information from the abnormal item ID of the RFID tag via the Monitoring and Alert Module 630 (S206); looking for an abnormal workstation via the Monitoring and Alert Module 630 (S208); sending out an alert to the abnormal workstation via the Monitoring and Alert Module 630 (S210); writing an abnormal processing information via the Manufacturing Information Synchronization Data Model 350 (S212); and finally, outputting the abnormal processing information table (S214). Moreover, after the step S204, the method comprises tracking and tracing for an abnormal WIP via the WIP Track and Trace Module 650 (S216) and monitoring the production yield via the Yield Monitoring Module 655 (S218).

Figure 10:
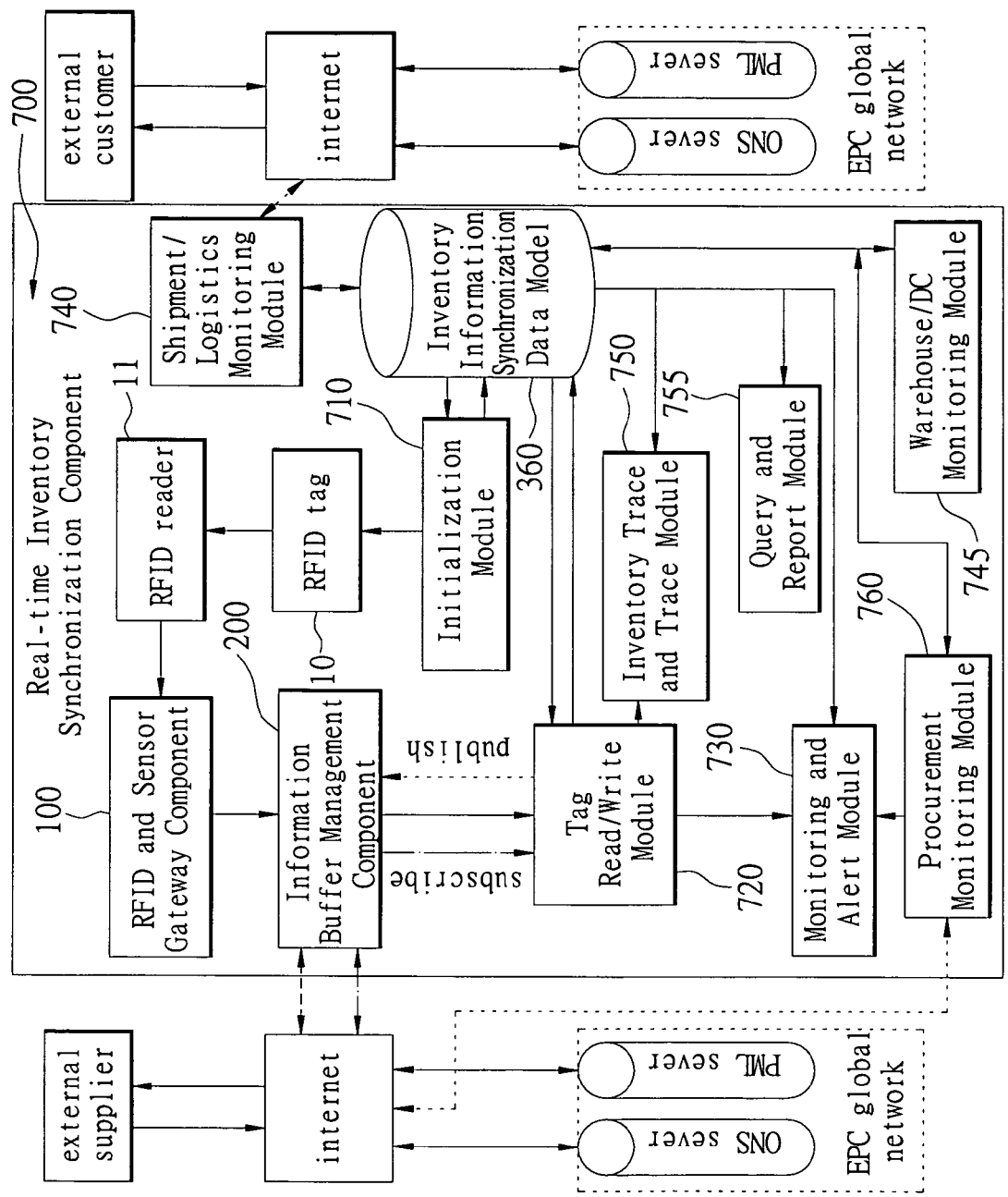
FIG. 10 is a block diagram of a Real-time Inventory Synchronization Component of a software system according to the present invention.

FIG. 10 shows a block diagram of a Real-time Inventory Synchronization Component of a software system according to the present invention. The Real-time Inventory Synchronization Component 700 is a present working monitoring management system, not a policy decision supply system. Hence large-scale manufacturing, such as for semiconductors or TFT-LCDs, needs the component 700 incorporated into every factory, and the Real-time Demand Fulfillment Synchronization Component 800 is incorporated into the mainframe of a company's computer system. The real-time inventory synchronization component 700 mainly includes:

1. An Initialization Module 710: The Module 710 is mainly used to appoint, transform, recycle and delete an RFID tag. For example, when a company receives components from another company and prepares to examine and warehouse goods with an RFID tag, the Module 710 judges whether the RFID tag of the other company is used or appointed according to business rules. When the goods are outbound, the Module 710 judges whether the RFID tag is recycled or deleted and performs other follow-up actions. Some steps of the Module 710 require manpower.

2. A Tag Read/Write Module 720: The Module 720 is mainly used to process information that is read by a reader for judging whether the goods are either incoming or outgoing goods, and writing any relevant inventory information in a database. Include 3. A Monitoring and Alert Module 730: The Module 730 is mainly used to process abnormal states of inbound and outbound inventory. When receiving and sending goods that have abnormal or if an error occurs, the module is started for controlling the abnormal states. The Module 730 has some steps, as follows:

A. Actively discovering abnormal inventory: When inventory goods have some problems such as being entered into the wrong warehouse, having blemishes or not conforming to standards, etc, the Monitoring and Alert Module 730 is actively notified by the Tag Read/Write Module 720 and obtains relevant information from the Tag Read/Write Module 720.

B. Sending out alerts: When the alert messages are sent out to operation workers of relevant warehouse/distribution centers, the operation workers execute returned purchase processing and quality management processing procedures according to relevant indicators.

C. Recoding abnormal information: The abnormal inventory receiving and sending records are written into the relevant data tables of the Data Model 350.

4. A Shipment/Logistics Monitoring Module 740: The Module 740 is used to receive information from shipping companies via the EPCglobal network or connect directly to relevant websites of shipping companies for tracking and tracing relevant information of a shipment.

5. A Warehouse/DC (Distribution Center) Monitoring Module 745: The Module 745 is used to receive relevant information of the RFID tag for monitoring relevant actions of warehoused and new arrived goods. If needed, the Module 745 can publish relevant information to the EPCglobal network. When checking inventory levels is necessary, the Module 745 can calculate immediately a total inventory for providing accurate and real-time inventory information.

6. An Inventory Track and Trace Module 750: The Module 750 provides a tracking function and tracing function. For example, the Module 750 can query the transportation process (such as transit factory information or transit information from factory to warehouse) of inventory to correctly track and trace the whereabouts of make and buy goods for reducing incorrect information during transportation of finished products and semi-finished products.

7. A Query and Report Module 755: The Module 755 is used to providing a query service and customization report for inventory information.

8. A Procurement Monitoring Module 760: The Module 760 is used to connect with information from a shipping company via the EPCglobal network or connect directly to a website of a shipping company for tracking and tracing relevant information for outgoing goods and incoming goods.

Figure 11:
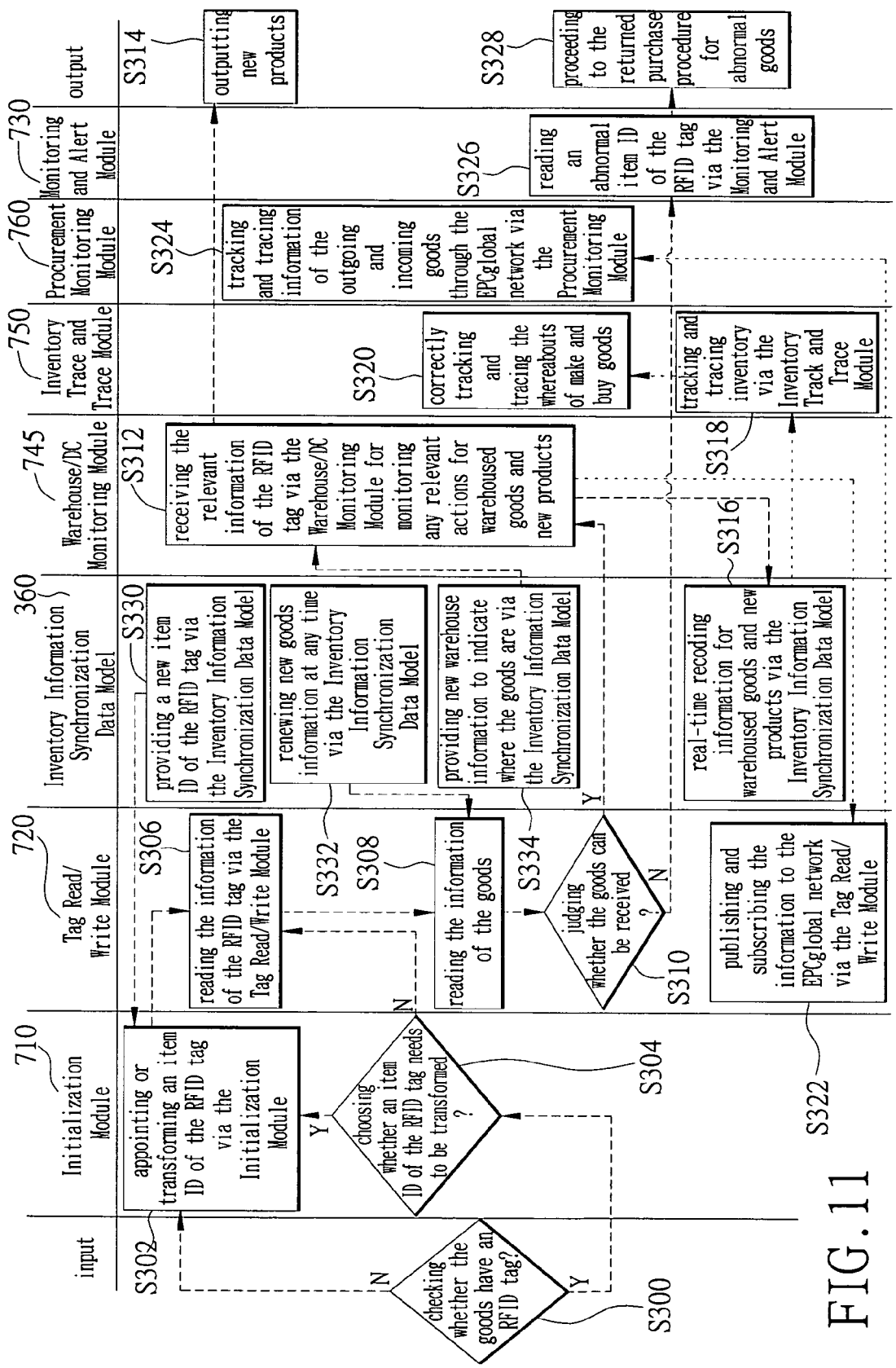
FIG. 11 is flowchart of a method for using a Real-time Inventory Synchronization Component of a software system according to the first embodiment of the present invention.

FIG. 11 shows a flowchart of a method for using Real-time Inventory Synchronization Components of a software system according to the first embodiment of the present invention. The method comprises: firstly, checking whether the goods have an RFID tag (S300); if no, appointing or transforming an item ID of the RFID tag via the Initialization Module 710 (S302); if yes, choosing whether an item ID of the RFID tag needs to be transformed (S304); if yes, returning to the step S302; if no, the same as the step S302, reading the information of the RFID tag via the Tag Read/Write Module 720 (S306); and then reading the information of the goods (S308); judging whether the goods can be received (S310); if yes, receiving the relevant information of the RFID tag via the Warehouse/DC Monitoring Module 745 for monitoring any relevant actions for warehoused goods and new products (S312); and finally, outputting new products (S314).

Moreover, after S312, the method further comprises real-time recoding information for warehoused goods and new products via the Inventory Information Synchronization Data Model 360 (316); tracking and tracing inventory via the Inventory Track and Trace Module 750 (S318); correctly tracking and tracing the whereabouts of make and buy goods (S320), or publishing and subscribing the information to the EPCglobal network via the Tag Read/Write Module 720 (S322); and then tracking and tracing information of the outgoing and incoming goods through the EPCglobal network via the Procurement Monitoring Module 760 (S324).

If the answer to step S310 is no, reading an abnormal item ID of the RFID tag via the Monitoring and Alert Module 730 (S326); and then proceeding to the returned purchase procedure for abnormal goods (S328). Before the step S302, the method further comprises providing a new item ID of the RFID tag via the Inventory Information Synchronization Data Model 360 (S330). Before the step S308, the method further comprises renewing new goods information at any time via the Inventory Information Synchronization Data Model 360 (S332). Before the step S312, the method further comprises providing new warehouse information to indicate where the goods are via the Inventory Information Synchronization Data Model 360 (S334).

Figure 12:
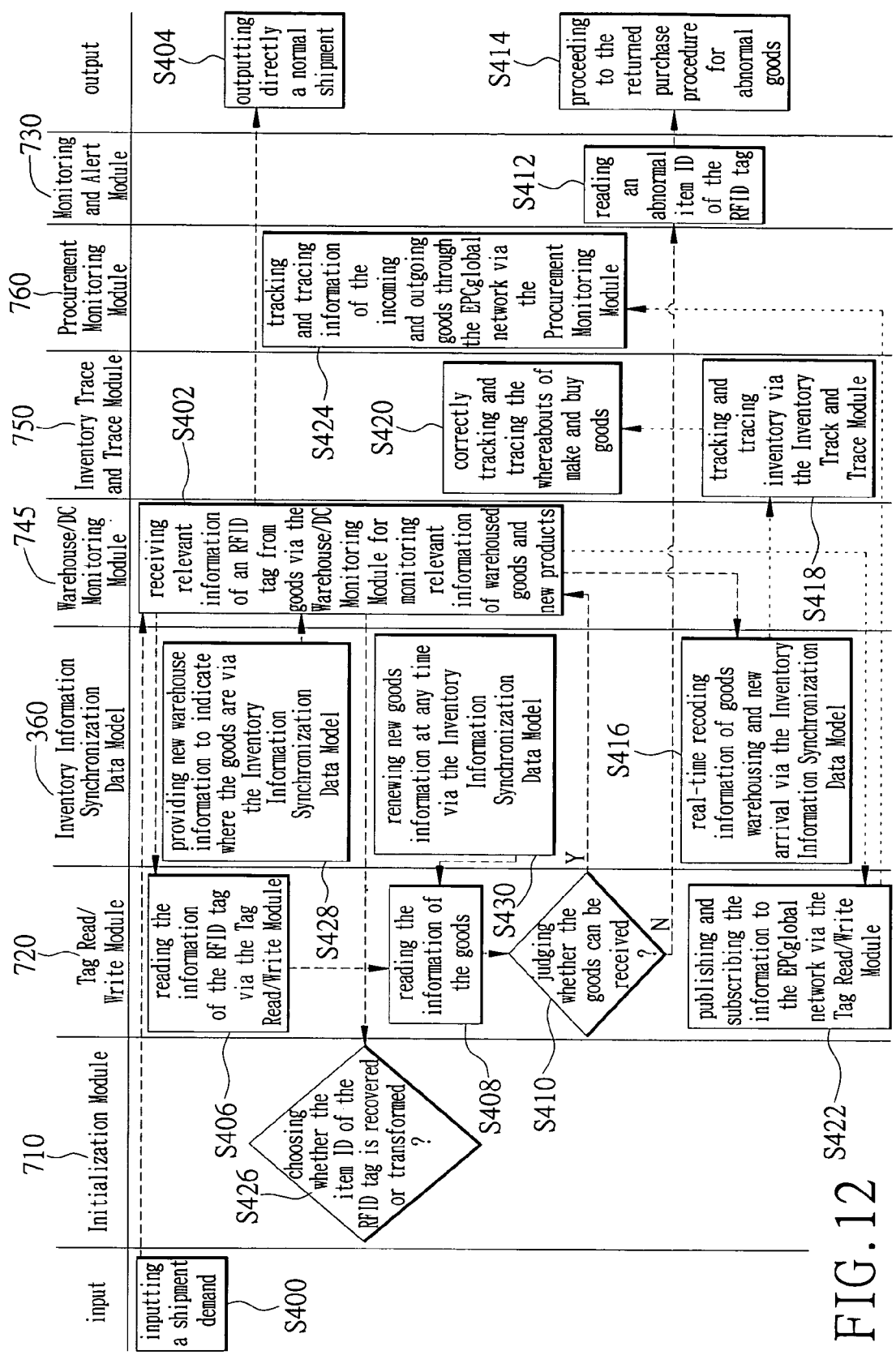
FIG. 12 is flowchart of a method for using a Real-time Inventory Synchronization Component of a software system according to the second embodiment of the present invention.

FIG. 12 shows a flowchart of a method for using a Real-time Inventory Synchronization Components of a software system according to the second embodiment of the present invention. The method comprises: firstly, inputting a shipment demand (S400); receiving relevant information of an RFID tag from goods via the Warehouse/DC Monitoring Module 745 for monitoring relevant information of warehoused goods and new products (S402); outputting directly a normal shipment (S404); reading the information of the RFID tag via the Tag Read/Write Module 720 (S406); reading the information of the goods (S408); judging whether the goods can be received (S410); if yes, returning to the step S402; if no, reading an abnormal item ID of the RFID tag (S412); and then proceeding to the returned purchase procedure for abnormal goods (S414).

Moreover, after the S402, the methods further comprises real-time recoding information of goods warehousing and new arrival via the Inventory Information Synchronization Data Model 360 (416); tracking and tracing inventory via the Inventory Track and Trace Module 750 (S418); correctly tracking and tracing the whereabouts of make and buy goods (S420), or publishing and subscribing the information to the EPCglobal network via the Tag Read/Write Module 720 (S422); and then tracking and tracing information of the incoming and outgoing goods through the EPCglobal network via the Procurement Monitoring Module 760 (S424).

Moreover, after the step S402, the method further comprises choosing whether the item ID of the RFID tag is recovered or transformed (S426). Before the step S402, the method further comprises providing new warehouse information to indicate where the goods are via the Inventory Information Synchronization Data Model 360 (S428). Before the step S408, the method further comprises renewing new goods information at any time via the Inventory Information Synchronization Data Model 360 (S430).

Figure 13:
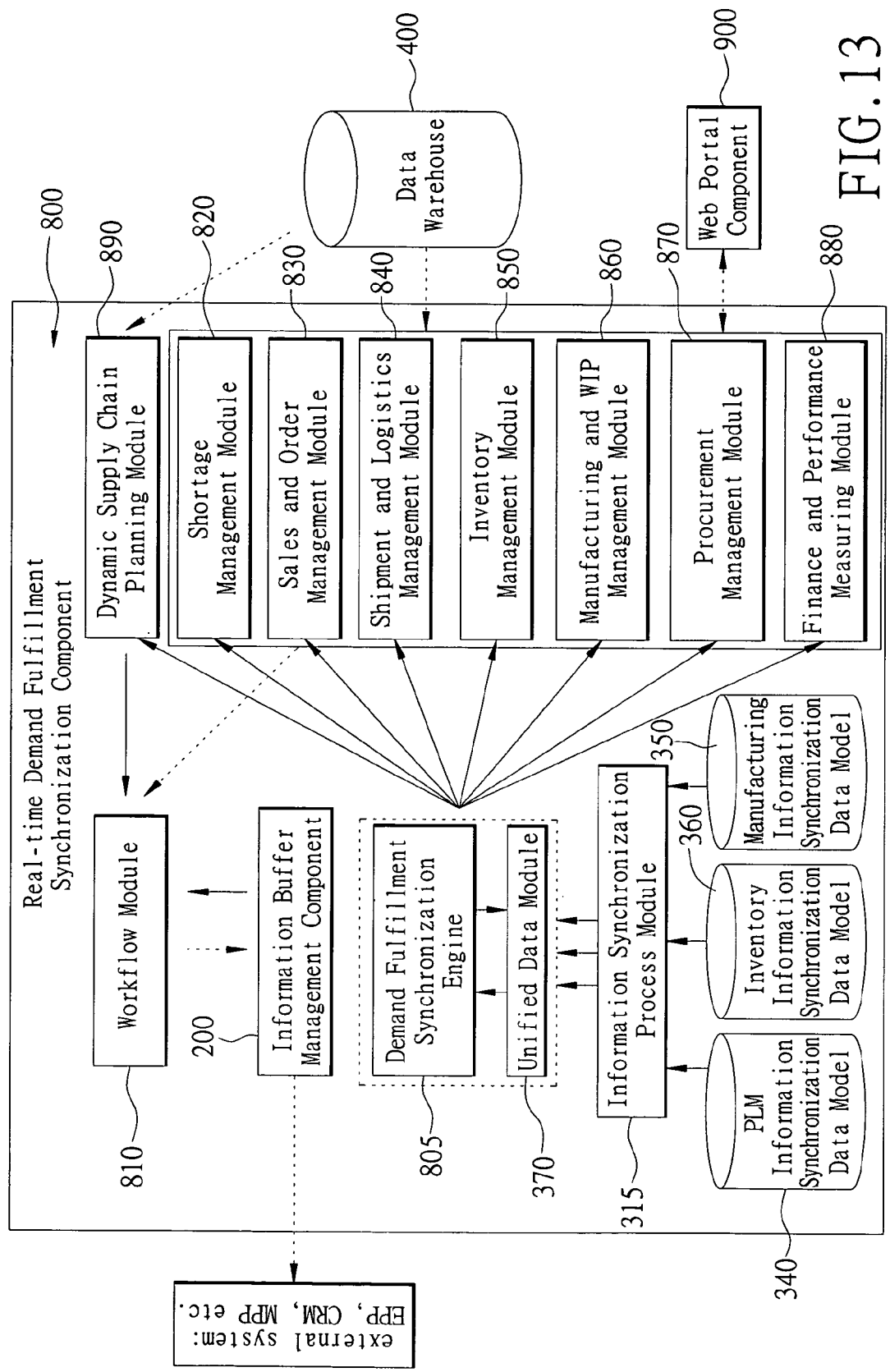
FIG. 13 is a block diagram of a Real-time Demand Fulfillment Synchronization Component of a software system according to the present invention.
Figure 14:
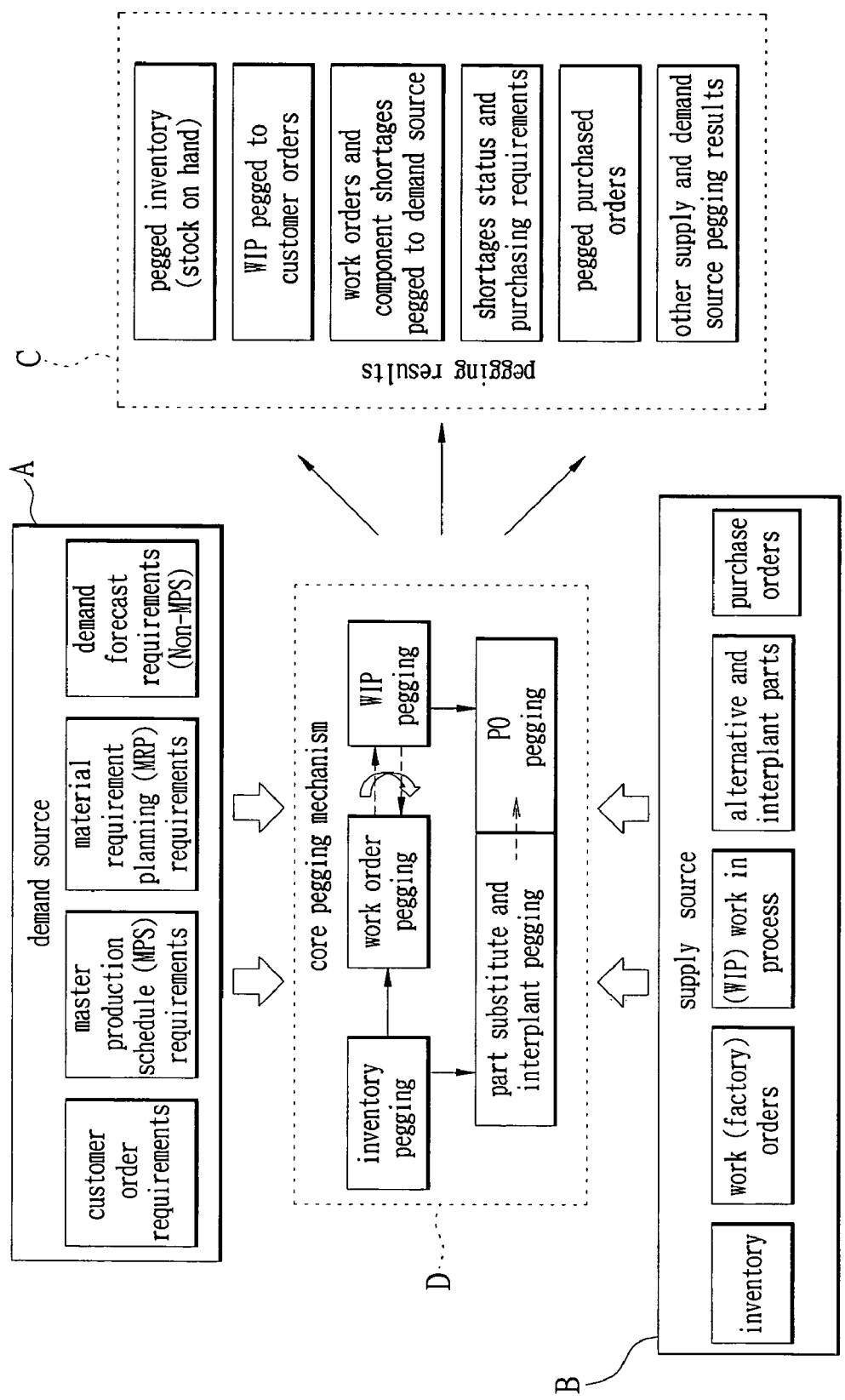
FIG. 14 is a block diagram of an all-dimensional pegging engine of a Real-time Demand Fulfillment Synchronization Component of a software system according to the present invention.
Figure 15:
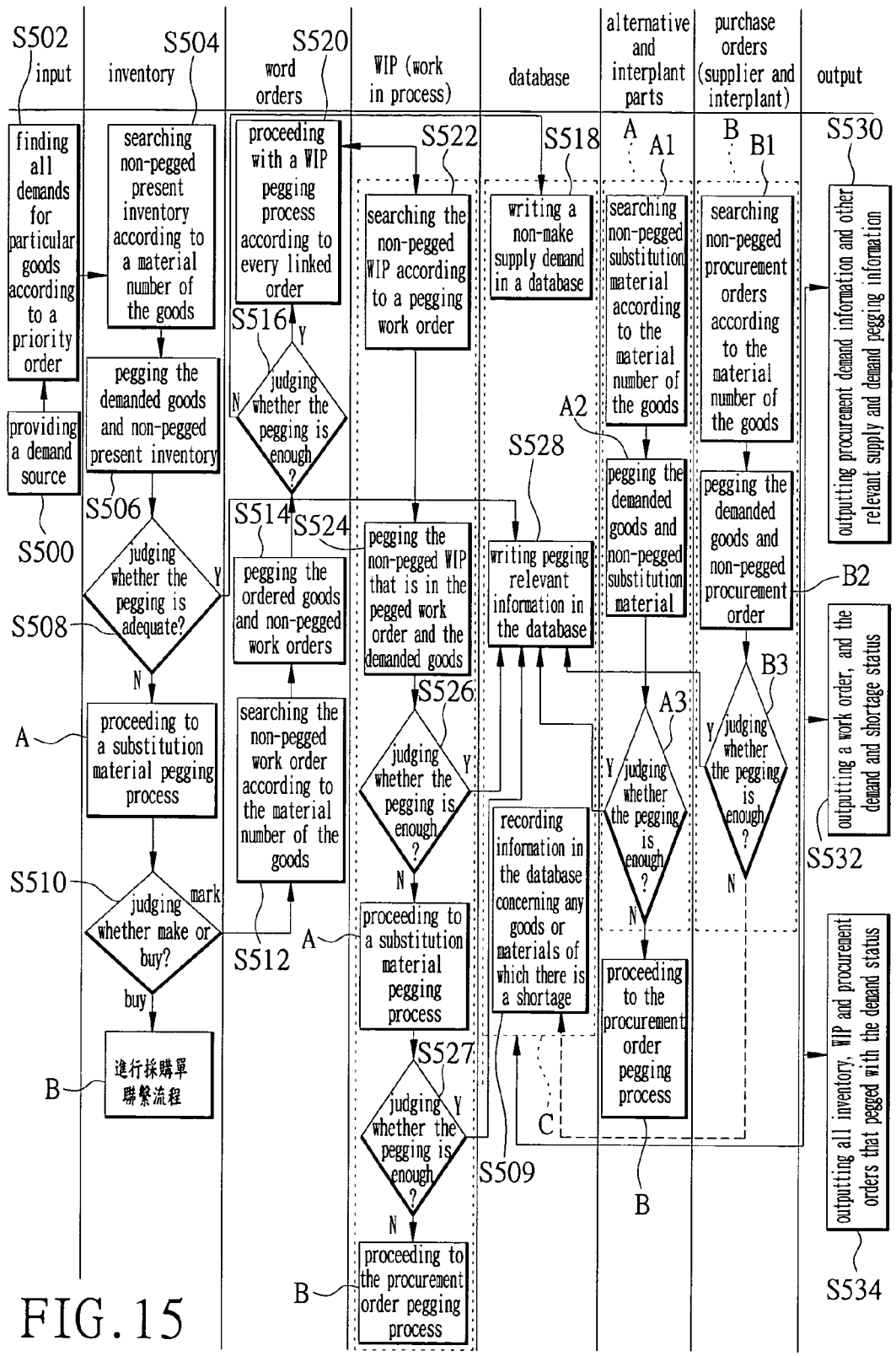
FIG. 15 is flowchart of a method for an all-dimensional pegging engine of a Real-time Demand Fulfillment Synchronization Component of a software system according to the present invention.

FIG. 13 shows a block diagram of Real-time Demand Fulfillment Synchronization Components of a software system according to the present invention. The Real-time Demand Fulfillment Synchronization Components 800 is an information synchronization calculation and logic core for the entire R2SCSS. The relationships among the supply and demand information, the identifying customer/sales orders and the procurement order/work orders are pegged together via the Components 800. The stratification and pegging operational metadata is provided to the Module 820-890 for users to view. The Real-time Demand Fulfillment Synchronization Components 800 includes:

1. A Demand Fulfillment Synchronization Engine 805: the Synchronization Engine 805 uses memory-based algorithms to perform high speed computations to build a demand source A and a supply source B) from extracted real time operational data provided by the Information Refresh and Load Switching Module 380 and through the Information Refresh and Load Switching Module 380 writing the pegging results C in the Unified Data Module 370 to build the operational metadata. The Demand Fulfillment Synchronization Engine 805 and the Information Refresh and Load Switching Module 380 work closely together to implement the core pegging mechanism D (its main operating logic is illustrated in FIGS. 14 and 15). For example, pegging work orders, work-in-process units and material shortages to customer orders is one such computation performed by the Demand Fulfillment Synchronization Engine 805. Since much of the information is sourced in real time (for example Inventory and WIP information), this synchronization engine will recalculate as often as every half an hour, depending on the parameters set in the Application Calibration Module 63 of the Application Administrating Components 60, to reflect changes of source data and generate synchronized information for a viewer.

FIG. 15 shows a flowchart of a method for an all-dimensional pegging engine of a Real-time Demand Fulfillment Synchronization Component of a software system according to the present invention. The method comprises: providing a demand source (S500); finding all demands for particular goods according to a priority order (S502), for example a customer's order or a factory material demand; searching non-pegged present inventory according to a material number of the goods (S504); pegging the demanded goods and non-pegged present inventory (S506); judging whether the pegging is adequate (S508); if no, proceeding to a substitution material pegging process (A) that means to search non-pegged substitution material according to the material number of the goods (A1), pegging the demanded goods and non-pegged substitution material (A2), and then judging whether the pegging is enough (A3); if no, proceeding to the procurement order pegging process (B), searching non-pegged procurement orders according to the material number of the goods (B1), pegging the demanded goods and non-pegged procurement order (B2), and then judging whether the pegging is enough (A3); if no, recording information in the database concerning any goods or materials of which there is a shortage (S509).

After step A, the method comprises of judging whether make or buy (S510); if buy, performing step B; if make, searching the non-pegged work order according to the material number of the goods (S512); pegging the ordered goods and non-pegged work orders (S514); judging whether the pegging is enough (S516); if no, writing a non-make supply demand in a database (S518); if yes, proceeding with a WIP pegging process according to every linked order (S520); searching the non-pegged WIP according to a pegging work order (S522); pegging the non-pegged WIP that is in the pegged work order and the demanded goods (S524); judging whether the pegging is enough (S526); if no, performing step A, and then judging whether the pegging is enough (S527); if no, performing step B.

Moreover, after the steps S508, S526, S527, A3 and B3, the method comprises: if yes, writing pegging relevant information in the database (S528). The steps S518, S528 and S514 are combined to become a real-time synchronization supply and demand pegging information (C); finally, outputting procurement demand information and other relevant supply and demand pegging information (S530), outputting a work order, and the demand and shortage status (S532), and all inventory, WIPs and procurement orders that pegged with the demand status (S534).

2. A Workflow Module 810: the Module 810 provides a workflow function or a business process flow function for the R2SCSS in the Information Synchronization Layer 4, and monitors and manages the operations of workflow or business process flows. When the Information Synchronization Layer 4 communicates with the Tag and Reader Layer 1, the RFID Middleware Layer 2 or the external systems, the Module 810 starts the business process flow management of the Information Buffer Management Components 200 to execute the relevant actions. Moreover, the Module 810 also provides a stylized interface for allowably defining or modifying processing logic of the workflow.

3. A Shortage Management Module 820: the Module 820 provides shortage list views that summarize all material needs while the detail views allow a user to drill down to specifics.

The user can navigate between different views based on the links built by pegging. For example, since part shortage information also pegs to customer orders, users (ex. planners and buyers) can easily see shortages using a variety of selection filters/options, and can drill up to the work orders and customer orders affected by each shortage, and customer and work orders can in turn drill down to the shortages affecting them. A user can also drill to PO supply that can clear the shortages. Various selection criteria allow a user to tailor views specifically to his or her needs. The Module 820 provides a summary view, a list view and a detailed view function according to the relevant material shortage information.

4. A Sales and Order Management Module 830: the Module provides various list and summary views regarding sales and customer order information. For example, a customer order stratification view gives a user a top-down view of the customer order status and relevant sales information while the detailed view allows a user to drill down to specifics. From a stratification view a user can drill down to order line detail status that is linked with work orders, shortages, purchase orders and WIP (work in process) units. The material status view displays pegging relationships between customer orders, work orders, and component shortages. Since work orders are pegged to customer orders, a user can see the impact of operational decisions on customer order commitments. A user can also drill to work order views that provide real time visibility into his or her factory, enabling a user to optimize the delivery of important customer orders. The customer order summary view enables a user to view customer order information by sales channel, sales person, sales office, sales territory and sales country. This module can also serve as a order tracking system that allow customers to see their order status over the Internet 24 hours a day, 7 days a week. Using the external comment feature of comment functionality, a company can provide narratives to customers to clarify the order status they see. This kind of interaction process between a company and its customers will synchronize their CPFR and achieve dramatic gains in customer satisfaction. The Module 830 provides a summary view, a list view and a detailed view function according to the relevant sales and order information.

5. A Shipment and Logistics Management Module 840: the Module provides various list and summary views regarding necessary shipment information and shipping status with respect to each customer. For example, from a shipment list view a user can also navigate to the customer orders that are being affected by the shipment. Various selection criteria allow a user to tailor views to his or her specific needs. The Module 840 provides a summary view, a list view and a detailed view function according to the relevant shipment and logistics information.

6. An Inventory Management Module 850: the Module 850 provides various list and summary views regarding inventory information and status. Users who procure material for production or experience part shortages will find this module can help them manage their inventory. For example, the inventory item list view provides a summary of the value of all inventoried material while the warehouse/location detail view allows a user to identify each inventory item and drill down to item lot and serial number specifics. As with the other modules, you can also navigate to other views based on the links built by pegging. For example, for a specific inventory item, a user can drill to the work orders of that item being affected by each shortage, and drill to the PO supply that can clear the shortages. The selection criteria allow a user to tailor views to their specific needs. The Module 850 provides a summary view, a list view and a detailed view function according to the relevant inventory status and inventory information.

7. A Manufacturing and WIP Management Module 860: the Module provides various list views, stratification views, and summary views regarding manufacturing and Work-in-Progress (WIP) status. For example, a user can view WIP units undergoing manufacture at a site or their current status of production. The WIP stratification view gives a user a top-down view of the units under production, while the WIP unit list view provides specific information to problem solving and taking action. A work order stratification view gives a user a top-down view of the schedule, while the list and detailed views allow a user to drill down to specifics. A user can drill to the customer orders supported by the work orders, component shortages, and WIP units under assembly. The selection criteria allow user to tailor views to his/her specific needs. The Module 860 provides a summary view, a list view and a detailed view function according to the relevant Manufacturing and WIP status, and the relevant Manufacturing and WIP information.

8. A Procurement Management Module 870: The Module 870 provides various lists and summary views for procuring information. For example, using a variety of criteria a user can view the purchase orders placed with suppliers for a specific factory site with their delivery schedule and current in-transit status. A user can drill to the shortages for a component on a purchase order, and from there find the sources of demand (ex. MRP requirements or Demand Forecast requirements) for that component. With the help of this module, a user can easily find the purchase orders needed to fill shortages or vice versa. The Module 870 provides a summary view, a list view and a detailed view function according to the relevant procurement information.

9. A Finance and Performance Measuring Module 880: The Module 880 is used to present an operating performance indicator and a key performance index via methods of form, statistical table and diagram. A common KPI is like inventory turns, delivery performance and asset utilization, etc. The user can judge whether the whole supply chain operation is/needs to be improved to improve and increase financial state for company according to the above-mentioned information.

10. A Dynamic Supply Chain Planning Module 890: the Module 890 uses mainly relevant synchronized demand and supply connection information of the Unified Data Model 370 and production capabilities of each factory, and refers to historical information of a Data Warehouse 400. Finally, the Module 890 produces the synchronized supply chain plan via the operation logic of a supply chain-planning engine thereof. The supply chain plan mainly has a production plan (such as production schedule and a prepared materials plan), a material requirement plan and a procurement plan that needs to consider lead time, etc. These plans are provided for a relevant policymaker to refer to/defer or make detailed plans. The supply chain plan can be executed every week or every day according to the demands of a company. Moreover, the Module 890 can to do a what-if analysis for a company before receiving orders, it can then calculate various changes, such as whether the production capabilities and materials are enough or are influential for production scheduling, after receiving orders to determine whether the company needs to receive orders, or how many orders have been received.

According to different user groups, the Components 800 have eight decision support systems from the Module 820 to the Module 880. The Module can be a real-time enterprise decision system for providing multi-dimensional enterprise information to relevant workmen to process spot incidents or take precautions in the supply chain system. The Modules have some functions, as follow:

A. The Modules 820-880 display real time stratification of information via the relevant website of the Web Portal Component 900 for a user to view by summary view, list view or detailed view methods, and provide various information filtering functions. A user is allowed to drill down the view from a metadata layer (Data Model 370) to an operational data layer (Data Models 320, 340, 350 and 360). Each of the Modules 820-880 can connect with two different layers in series via a computer program according to demand. Therefore, top decision information can connect to bottom scene operating metadata for an enterprise policymaker to control the latest state to make real-time synchronization judgments and decisions.

B. Each of the Modules 820-880 sets up an event-warning agent to issue a warning for notifying the relevant user according to the relevant major supply chain event, such as if the inventory of a material is lower than a standard or the supplier has a problem about outbound goods. The event-warning agent judges whether to send out a warning according to historical data, new synchronization supply chain information or a build-in artificial intelligence logic, such as algorithms. Hence the event-warning agent can continuously study and adjust the judgment for adapting to a changeable supply chain environment to become an adaptive software agent. If needed, the event-warning agent can communicate with the external system, such as ERP system, via a Workflow Module 810 and the Information Buffer Management Components 200. For example, the event-warning agent can notify of the need for the procurement to proceed with follow-up procurement flows.

C. Each of the Modules 820-880 can provide a message management function (containing internal and external comment features) for recording action or explanations and comments from a user according to some important supply events. Moreover, each of the Modules 820-880 can provide message management functionality (containing internal and external comment features) to record actions or comments that are executed in significant supply chain events by a user, wherein the recording information can be a reference for relevant personnel to improve or for a director to check.

D. Each of the Modules 820-880 can provide relevant charts or diagrams about important information in the Modules 820-880 on a website for decision and analysis.

With regard to the Web Portal Component 900, it acts as a communication interface between internal business and external users. The Web Portal Component 900 provides some services, such as an Internet service and a communication service, wherein:

1. The web service is used to provide a customized Internet service portal and other relevant network resources according to different users; and 2. The communication service is used to provide a message communication service between users, such as E-mail, a real-time announcement system and an on-line forum, etc.

Figure 16:
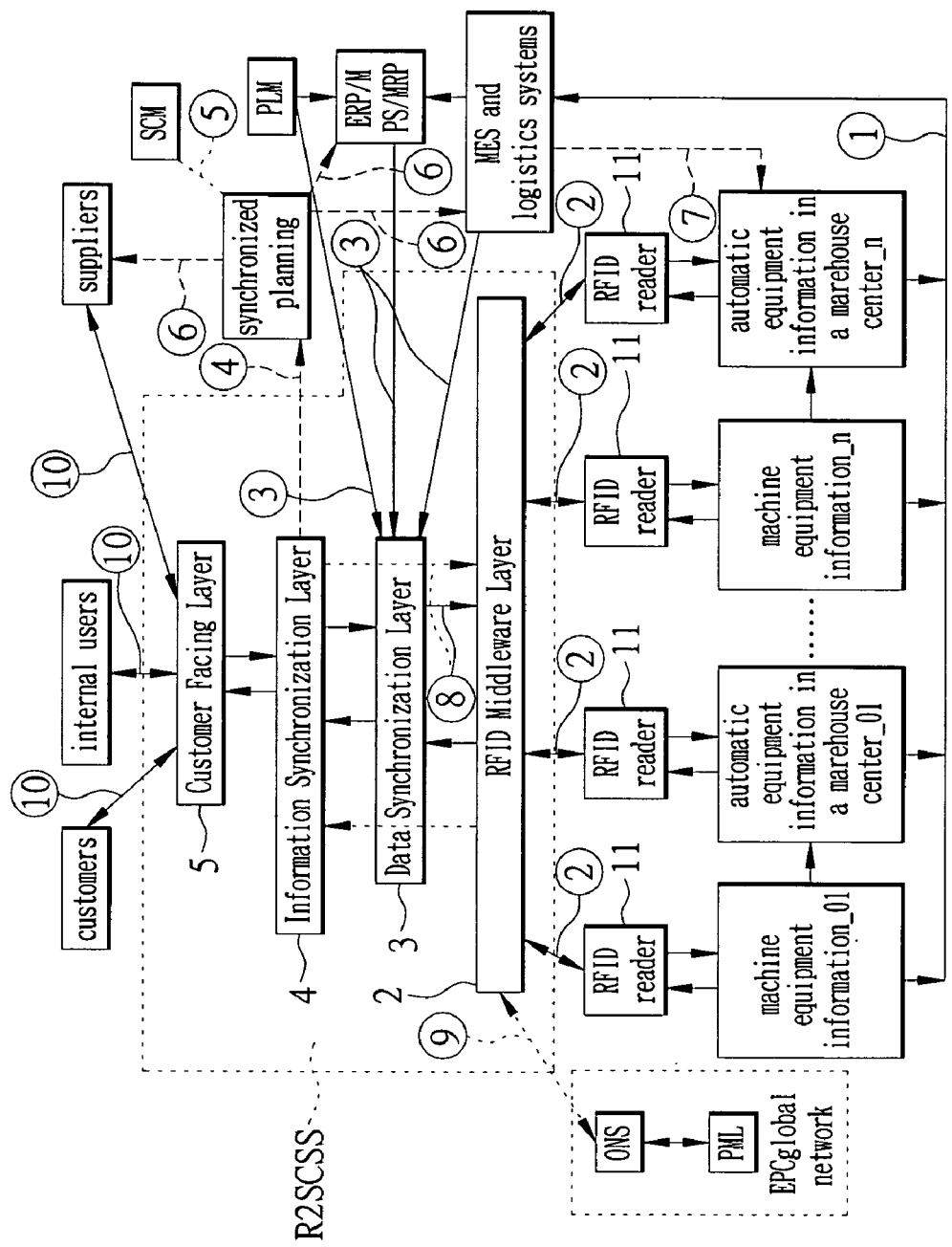
FIG. 16 is a block diagram of a system integration mold and a method thereof according to the present invention.

FIG. 16 shows a block diagram of a system integration mold and a method thereof according to the present invention. The R2SCSS has various integrations according to different demands. For example, a translational corporation has factories, buildings and warehouse centers dispersed throughout the world. A method of system integration mold between an enterprise's internal and external information and R2SCSS is disclosed (a closed-loop supply chain synchronization process integration is the key point), as follows:

① Real Time Enterprise Resource Information means machine or automatic equipment information (including static and dynamic information) in a factory, or automatic equipment information in a warehouse center. If the machines or automatic equipment in a factory lacks an RFID device, the information about the machines or automatic equipment can be transmitted to an MES (Manufacturing Execution System) or another logistics system via an internal business network system, such as a LAN (Local Area Network), and then the information can be transmitted back to the R2SCSS via MES (Manufacturing Execution System) or logistics system.

② The real-time RFID information of a factory or a warehouse center is acquired via RFID readers 11 that are distributed over a factory or a warehouse center, and is transmitted to the RFID Middleware Layer 2 for further processing.

③ The R2SCSS can acquire new information from an enterprise via the Data Synchronization Layer 3 within a specific time period, and then transform the new information to application modules thereof for use. The acquired objects include ERP (Enterprise Resource Planning), MPS (Master Production Schedule) that is usually included in ERP, MRP (Material Requirement Planning) that is usually included in ERP, PLM (Product Life Cycle Management), MES (Manufacturing Execution System) and a logistics system.

④ The real-time RFID information and enterprise information is synchronized via the Data Synchronization Layer 3 and the Information Synchronization Layer 4. The Dynamic Supply Chain Planning Module 890 of the Component 800 produces relevant synchronized supply chain planning via synchronized supply and demand pegging information and production capability information of the Unified Data Module 370 and historical data of the Data Warehouse 400.

⑤ Optional Step: If a company hopes to use its own SCM system for supply chain planning, the company can refer or integrate the synchronized supply chain plan in step ④ to strengthen the correctness and the execution of the plan. Another integration method is to acquire the synchronized supply chain information of the R2SCSS by a present supply chain management system via an ETL procedure to analyze for producing more accurate supply chain planning.

⑥ The supply chain plan produced from step ④ or step ⑤ is provided for a relevant system to use. For example, the procurement plan or the material requirement plan of a synchronized supply chain plan can notify a supplier to prepare materials earlier. Moreover, the relevant production plan of the synchronized supply chain plan will be a reference of a work order for an MRP system or an MES system for a company or a factory to make further detailed manufacturing schedules.

⑦ Detailed execute planning is produced via an MES or logistics system according to each factory, building or warehouse center, such as production arranged planning or warehouse management planning. The executed results of the planning are sent to a R2SCSS via evacuation scene information such as RFID data for a base of next planning.

⑧ The information change of the data synchronization layer 3 and the information synchronization layer 4 can directly affect the operation of the present RFID tag 10 and the RFID reader 11 via the RFID middleware layer 2. For example, some particular models of products need to be modified according to a customer's demand for replacing an important component.

Firstly, when the BOM in the PDM (Product Data Management) or PLM (Product Life Cycle Management) is changed, the changed information of the BOM is transmitted to the master data synchronization module 510, the product data change management module 550 and the PLM information synchronization data model 340 via the database/ETL component 300 of the R2SCSS for recoding the relevant changed information to the data model 340. Afterward, the product data change management module 550, the workflow module 810 and the data model 350 and 360 are notified about the information change and record the relevant changed information. When both the tag read/write module 620 of the real-time manufacturing synchronization component 600 and the tag read/write module 720 of the real-time inventory synchronization component 700 detect the change of the material, notifying the changed information to the relevant RFID reader 11 of each factory, building or warehouse center via the workflow module 810, the information buffer management component 200 and the RFID and sensor gateway component 100. If the component uses an old standard to detect and an old method of detection, the component is classified as an abnormal item ID of an RFID tag. At the same time the Monitoring and Alert Module 630 issues the abnormal information to the next relevant unit to perform the next abnormal process such as returning goods or pausing production to reduce losses. Hence, information from product design to product production can be transmitted, jointed, updated and synchronized quickly.

⑨ Optional step: The R2SCSS can connect with the EPCglobal Network via the RFID Middleware Layer 2 for data transmission. A company can publish supply chain information relevant to the internal RFID to the EPCglobal Network, and also can allow the supply chain information from the EPCglobal Network to be viewed by another user.

⑩ In the entire R2SCSS system, all users such as internal users, customers and suppliers can monitor the entire supply chain state via the Web Portal Component 900 of the Customer Facing Layer 5. Hence, when a supply chain gap appears, such as when supply and demand are out of balance, the relevant parts of each company, the customer and the supplier can coordinate with each other cording to synchronize supply chain information of the R2SCSS. The steps ① to ⑩ are repeatedly performed as the closed-loop supply chain synchronization process is continuously operating.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An RFID (Radio Frequency Identification)-enabled Real-time Supply Chain Synchronization System (R2SCSS), comprising:
    an RFID and Sensor Gateway Component for receiving information from a Tag and Reader Layer;
    an Information Buffer Management Component at least communicating with the RFID and Sensor Gateway Component, wherein the Information Buffer Management Component is an interface between an RFID Middleware Layer and a Data Synchronization Layer;
    a Database/Extraction Transformation and Loading (ETL) Component at least communicating with the Information Buffer Management Component;
    a Real-time Product Information Synchronization Component, a Real-time Manufacturing Synchronization Component, a Real-time Inventory Synchronization Component and a Real-time Demand Fulfillment Synchronization Component communicating with each other to form a Core Component, wherein the Core Component communicates with the Information Buffer Management Component and the Database/Extraction Transformation and Loading (ETL) Component;
    a Data Warehouse communicating with the Information Buffer Management Component, the Database/Extraction Transformation and Loading (ETL) Component and the Core Component; and
    a Web Portal Component communicating with the Core Component for use by a user.

2. The system as claimed in claim 1, further comprising an Application Administrating Component for monitoring software operations of the system.

3. The system as claimed in claim 1, further comprising a System Administrating Component for monitoring software and hardware operations of the system.

4. The system as claimed in claim 1, wherein the Database/Extraction Transformation and Loading (ETL) Component comprises a Data Import Module, a Data Synchronization Process Module, a Raw Data Processing data model, a Product Information Synchronization Data Model, a Manufacturing Information Synchronization Data Model, an Inventory Information Synchronization Data Model, an Information Synchronization Process Module, an Unified Data Module, an Information Refresh and Load Switching Module and a Data Warehouse;
    wherein the Data Import Module is used to receive information from different data sources and initially filter and transform the data, and the initial preprocessing data is stored in the Raw Data Processing Data Model;
    wherein the Data Synchronization Process Module is used to further process data that is cached in the Raw Data Processing Data Model for ensuring completeness and unity of the data, and then transmit individual data to the Product Information Synchronization Data Model, the Manufacturing Information Synchronization Data Model and the Inventory Information Synchronization Data Model via an Extraction Transformation and Loading (ETL) procedure;
    wherein the Raw Data Processing data model is a cached area for storing the initial preprocessing data, and then the initial preprocessing data is transmitted to the Data Synchronization Process Module and the Information Synchronization Process Module to perform further processes;
    wherein the Product Information Synchronization Data Model is used to store synchronal master data and planning Bill of Material (BOM) data;

wherein the Manufacturing Information Synchronization Data Model is used to store synchronal producing and manufacturing information and relevant processing information;

wherein the Inventory Information Synchronization Data Model is used to store synchronal inventory information, warehouse information and material flow information;

wherein the Information Synchronization Process Module is used to further process and extract data stored in the Product Information Synchronization Data Model, the Manufacturing Information Synchronization Data Model and the Inventory Information Synchronization Data Model to ensure completeness and unity of data;

wherein the Unified Data Module communicates with the Information Synchronization Process Module;

wherein the Information Refresh and Load Switching Module works with a Demand Fulfillment Synchronization Engine to implement a unique information building plus data caching and switching mechanism to achieve fast turnaround of operational data from the Raw Data Processing data model, the Product Information Synchronization Data Model, the Manufacturing Information Synchronization Data Model and the Inventory Information Synchronization Data Model; and wherein the Data Warehouse is used to store operational data that mainly comes from the Product Information Synchronization Data Model, the Manufacturing Information Synchronization Data Model and the Inventory Information Synchronization Data Model, and operational metadata that mainly comes from the Unified Data Module for use in complex data analysis and data mining.

5. The system as claimed in claim 4, wherein the Real-time Product Information Synchronization Component comprises a Master Data Synchronization Module, a Supply Chain Planning Bill of Material (BOM) Management Module, a Product/Component E-Pedigree Management Module, a Product Sourcing Module, a Product Data Change Management Module and a Query and Report Module;

wherein the Master Data Synchronization Module is used to receive preprocessing data from the Data Synchronization Process Module, classify and process the preprocessing data, and store the data in the Product Life cycle Management (PLM) Information Synchronization Data Model;

wherein the Supply Chain Planning Bill of Material (BOM) Management Module is used to acquire relevant item master data to build supply chain planning Bill of Material (BOM) within a specific time period, and then store the Bill of Material (BOM) data in the relevant tables of the Unified Data Module via the Extraction Transformation and Loading (ETL) procedure of the Information Synchronization Process Module within a specific time period;

wherein the Product/Component E-Pedigree Management Module uses an RFID and an Electronic Product Code (EPC) to record and compile movement paths and product processes of an RFID event via the EPCglobal Network, and then build an E-Pedigree of make and buy and store the E-Pedigree of make and buy in the Product Life cycle Management (PLM) Information Synchronization Data Model;

wherein the Product Sourcing Module is used to provide a part search function, supplier/vendor sourcing function and a Request For Quote (RFQ) function;

wherein the Product Data Change Management Module 550 is used to record relevant changed information to the Product Life cycle Management (PLM) Information Synchronization Data Model; and wherein the Query and Report Module is used to provide a query service and a customization report for products and components.

6. The system as claimed in claim 4, wherein the Real-time Manufacturing Synchronization Component comprises an Initialization Module, a Tag Read/Write Module, a Monitoring and Alert Module, a Work In Process (WIP) Track and Trace Module, a Yield Monitoring Module and a Query and Report Module;

wherein the Initialization Module is used to delete a new RFID tag or a recyclable RFID tag, and give a new item ID of the RFID on a product;

wherein the Tag Read/Write Module is used to process information that is read by reader, judge whether the process is normal or not, and write relevant information in a database;

wherein the Monitoring and Alert Module communicates with the Tag Read/Write Module for processing abnormal states in a production scene;

wherein the Work In Process (WIP) Track and Trace Module provides a tracking function and tracing function;

wherein the Yield Monitoring Module communicates with the Work In Process (WIP) Track and Trace Module; and wherein the Query and Report Module communicates with the Inventory Information Synchronization Data Model and is used to providing a query service and a customization report for present production information.

7. A method for an RFID (Radio Frequency Identification)-enabled Real-time Supply Chain Synchronization System (R2SCSS), comprising:

initiating a new RFID tag via an initialization module;

reading initiated information of the new RFID tag via a Tag Read/Write Module;

reading processing information of the new RFID tag via the Tag Read/Write Module; and judging whether the reading step reads an item ID with normal-condition processing information or reads an item ID with abnormal-condition processing information via the Tag Read/Write Module.

8. The method as claimed in claim 7, wherein the judging step reads an item ID with normal-condition processing information, the method further comprising:

writing processing stations and processing times via a Manufacturing Information Synchronization Data Model;

tracking and tracing the Work In Process (WIP) via a Work In Process (WIP) Track and Trace module; and monitoring production yield via the Yield Monitoring Module.

9. The method as claimed in claim 7, wherein the judging step reads an item ID with normal-condition processing information, the method further comprising:

writing processing stations and processing times via a Manufacturing Information Synchronization Data Model; and publishing the relevant parts of the information of a Work In Process (WIP) to an EPCglobal network via the Tag Read/Write Module, monitoring production yield via a Yield Monitoring Module, directly outputting the item ID with normal-condition processing information of the RFID tag, or providing a query service and a customization report for spot production information via the query and report module.

10. The method as claimed in claim 7, wherein the judging step reads an item ID with abnormal-condition processing information, the method further comprising:

reading the item ID with abnormal-condition processing information of the RFID tag via the Monitoring and Alert Module; and outputting the item ID with abnormal-condition processing information of the RFID tag.

11. The method as claimed in claim 7, before the step of initiating the new RFID tag, further comprising providing a new item ID of the RFID tag via a Manufacturing Information Synchronization Data Model.

12. The method as claimed in claim 7, before the reading processing information step, further comprising renewing new processing information at any time via a Manufacturing Information Synchronization Data Model.

13. A method for an RFID (Radio Frequency Identification)-enabled Real-time Supply Chain Synchronization System (R2SCSS), comprising:

writing an item ID with abnormal-condition processing information into an RFID tag;

reading the item ID with abnormal-condition processing information of the RFID tag via a Monitoring and Alert Module;

querying processing information of a Manufacturing Information Synchronization Data Model according to the item ID with abnormal-condition processing information;

reading the processing information of the RFID tag via the Monitoring and Alert Module;

looking for an abnormal workstation via the Monitoring and Alert Module;

outputting an alert to the abnormal workstation via the Monitoring and Alert Module;

writing abnormal processing information via the Manufacturing Information Synchronization Data Model; and outputting an abnormal processing information table to a Database/Extraction Transformation and Loading (ETL) Component.

14. The method as claimed in claim 13, after the querying processing information step, further comprising tracking and tracing for abnormal Work In Process (WIP) via a Work In Process (WIP) Track and Trace Module and monitoring production yield via a Yield Monitoring Module.

* * * * *